(12) United States Patent
Saiga

(10) Patent No.: US 11,726,304 B2
(45) Date of Patent: Aug. 15, 2023

(54) FOLDED OPTICAL SYSTEMS

(71) Applicant: Apple Inc., Cupertino, CA (US)

(72) Inventor: Takeyoshi Saiga, Tokyo (JP)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 17/329,009

(22) Filed: May 24, 2021

(65) Prior Publication Data

US 2021/0382269 A1  Dec. 9, 2021

Related U.S. Application Data

(60) Provisional application No. 63/030,224, filed on May 26, 2020.

(51) Int. Cl.
  *G02B 13/10* (2006.01)
  *G02B 13/00* (2006.01)
  *G03B 17/17* (2021.01)

(52) U.S. Cl.
  CPC ......... *G02B 13/007* (2013.01); *G02B 13/003* (2013.01); *G03B 17/17* (2013.01)

(58) Field of Classification Search
  CPC ............................. G02B 13/007; G02B 13/10
  See application file for complete search history.

(56) References Cited

U.S. PATENT DOCUMENTS

| | | | |
|---|---|---|---|
| 6,674,513 B2 | 1/2004 | Omura | |
| 6,940,655 B2 | 9/2005 | Sato | |
| 7,646,418 B2 | 1/2010 | Nanjo | |
| 8,587,873 B2 | 11/2013 | Yun et al. | |
| 2009/0141503 A1* | 6/2009 | Phillips, III | G02B 27/149 362/311.06 |
| 2015/0253647 A1 | 9/2015 | Mercado | |
| 2017/0276913 A1 | 9/2017 | Yao et al. | |
| 2019/0196148 A1 | 6/2019 | Yao et al. | |
| 2020/0073028 A1 | 3/2020 | Shigemitsu et al. | |
| 2021/0048628 A1* | 2/2021 | Shabtay | G02B 9/64 |

FOREIGN PATENT DOCUMENTS

WO  2013065391  5/2013

OTHER PUBLICATIONS

International Search Report and Written Opinion from PCT/US2021/034018, dated Sep. 7, 2021. pp. 1-15.

* cited by examiner

*Primary Examiner* — Darryl J Collins
(74) *Attorney, Agent, or Firm* — Robert C. Kowert; Kowert, Hood, Munyon, Rankin & Goetzel, P.C.

(57) ABSTRACT

Single fold optical systems that include a power prism and a lens stack including two or more refractive lens elements. The single fold optical system may provide a long mechanical back focus without increasing the Z-height of the optical system. Providing power on the prism may reduce the optical total length and reduce the X-length of the optical system. The single folded optical systems may provide reduced Z-axis height and reduced X-axis length when compared to conventional double folded optical systems with similar optical characteristics. In addition, the optical systems may include an anamorphic lens that is oriented to correct for astigmatism caused by surface errors of the reflective surface of the prism.

19 Claims, 21 Drawing Sheets

| | |
|---|---|
| MTF(inf) | |
| MTF(macro) | |
| X length | 17.2mm |
| Z height | 6.8mm |
| Distortion | < +/-0.25% |

FIG. 6B

| | |
|---|---|
| MTF(inf) |  |
| MTF(macro) |  |
| X length | 17.2mm |
| Z height | 6.5mm |
| Distortion | < +/-0.25% |

FOLDED OPTICAL SYSTEMS

This application claims benefit of priority to U.S. Provisional Application Ser. No. 63/030,224, entitled "Folded Optical Systems," filed May 26, 2020, and which is incorporated herein by reference in its entirety.

BACKGROUND

Technical Field

This disclosure relates generally to camera systems, and more specifically to folded optical systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of an image sensor with small pixel size and a good, compact imaging lens system. Advances in technology have achieved reduction of the pixel size in image sensors. However, as image sensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an optical system that is capable of capturing high brightness, high resolution images under the physical constraints imposed by small form factor cameras.

SUMMARY OF EMBODIMENTS

Embodiments of single fold optical systems that include a single prism with optical power (referred to as a power prism) and a lens stack including two or more refractive lens elements are described. The power prism may be referred to as a first lens group, and the lens stack may be referred to as a second lens group. The single folded optical systems may provide reduced Z-axis height and reduced X-axis length when compared to conventional double folded optical systems with similar optical characteristics. Embodiments of the single fold optical systems may, for example, be used in small form factor cameras in mobile multipurpose devices such as smartphones and tablet or pad devices.

In some embodiments, the power prism is formed of an optical plastic material, and the object side surface of the prism is a curved spherical or aspherical surface to provide refractive power. In some embodiments, the power prism is an optical glass triangular prism with a refractive lens formed of an optical plastic attached to the object side of the prism to provide refractive power. In some embodiments, the power prism is an optical glass triangular prism with a refractive lens formed of an optical glass attached to the object side of the prism.

In addition, embodiments of folded optical systems that include at least one anamorphic lens that is oriented to correct for aberrations including astigmatism caused by surface errors of the reflective surface of the prism(s) in the folded optical systems are described. An anamorphic lens as described herein may, for example, be used in embodiments of the single fold optical systems that include a single power prism as described herein. However, anamorphic lenses as described herein may also be used in other single fold optical systems or double fold optical systems to correct for aberrations including astigmatism caused by surface errors of the reflective surface(s) of the prism(s) in the folded optical systems. Anamorphic lenses as described herein may be used to correct for aberrations caused by the flat reflective surfaces of power prisms or triangular prisms or by the curved reflective surfaces of prisms such as freeform prisms.

A manufacturing process for folded optical systems that include anamorphic lenses to correct for aberrations including astigmatism caused by surface errors of the reflective surface(s) of the prism(s) is also described.

BRIEF DESCRIPTION OF THE DRAWINGS

FIG. 6B illustrates optical characteristics and performance metrics of the example optical system illustrated in FIG. 6A.

Figure 1:
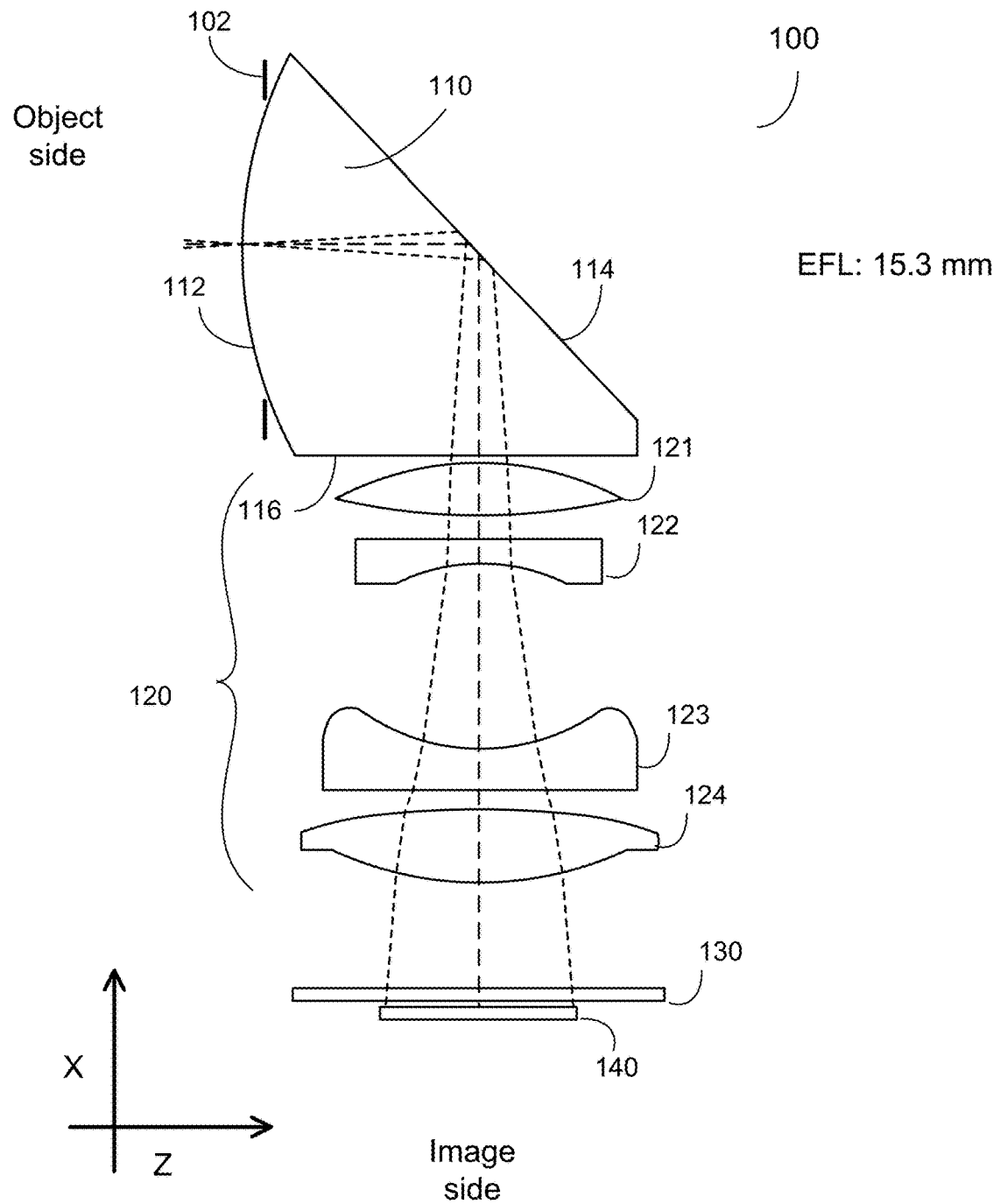
FIG. 1 illustrates an example single fold optical system that includes a power prism composed of an optical plastic, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a single fold optical system are described that may, for example, be used in small form factor cameras in mobile multipurpose devices such as smartphones and tablet or pad devices. Conventional double folded optical systems may include two prisms and a lens stack including two or more refractive lens elements. A first prism redirects light from a first optical axis to the lens stack on a second optical axis. A second prism located at the image side of the lens stack folds the optical axis on to a third axis where an image is formed at an image plane at or near the surface of a photosensor.

Embodiments of single fold optical systems that include a single prism with optical power (referred to as a power prism) and a lens stack including two or more refractive lens elements as described herein may provide an optical system with long focal length and reduced thickness (Z-height) and X-length when compared to a double folded optical system with similar optical characteristics. In general, the Z-height of double folded optics is defined by the prism size and mechanical back focus. Embodiments of the single fold optical system may provide a long mechanical back focus without increasing the Z-height of the optical system. Providing power on the prism may reduce the optical total length and reduce the X-length of the optical system.

In some embodiments, the power prism in the single fold optical system is formed of an optical plastic material, and the object side surface of the prism is a curved spherical or aspherical surface to provide refractive power. In some embodiments, the power prism is an optical glass triangular prism with a refractive lens formed of an optical plastic attached to the object side of the prism to provide refractive power. A first surface of the lens may be an aspherical or spherical surface. In some embodiments, the power prism is an optical glass triangular prism with a refractive lens formed of an optical glass attached to the object side of the prism. A first surface of the lens may be an aspherical or spherical surface. Note that the power prism has more than three surfaces; however, only three of the surfaces of the power prism are discussed; an object side surface with curvature that provides refractive power; a reflective surface that acts to fold the optical axis; and an image side surface through which light from the reflective surface exits the power prism towards the lens stack or second lens group.

In addition, embodiments of folded optical systems that include at least one anamorphic lens that is oriented to correct for aberrations including astigmatism caused by surface errors of the reflective surface of the prism(s) in the folded optical systems are described. An anamorphic lens as described herein may, for example, be used in embodiments of the single fold optical systems that include a single power prism as described herein. However, anamorphic lenses as described herein may also be used in other single fold optical systems or double fold optical systems to correct for aberrations including astigmatism caused by surface errors of the reflective surface(s) of the prism(s) in the folded optical systems. Anamorphic lenses as described herein may be used to correct for aberrations caused by the flat reflective surfaces of power prisms or triangular prisms or by the curved reflective surfaces of prisms such as freeform prisms. Freeform optics involve optical designs with at least one surface which has no translational or rotational symmetry about axes normal to the mean plane of the surface. A freeform prism is thus a prism that has at least one surface which has no translational or rotational symmetry about axes normal to the mean plane of the surface.

A manufacturing process for folded optical systems that include anamorphic lenses to correct for aberrations including astigmatism caused by surface errors of the reflective surface(s) of the prism(s) is also described.

Figure 2:
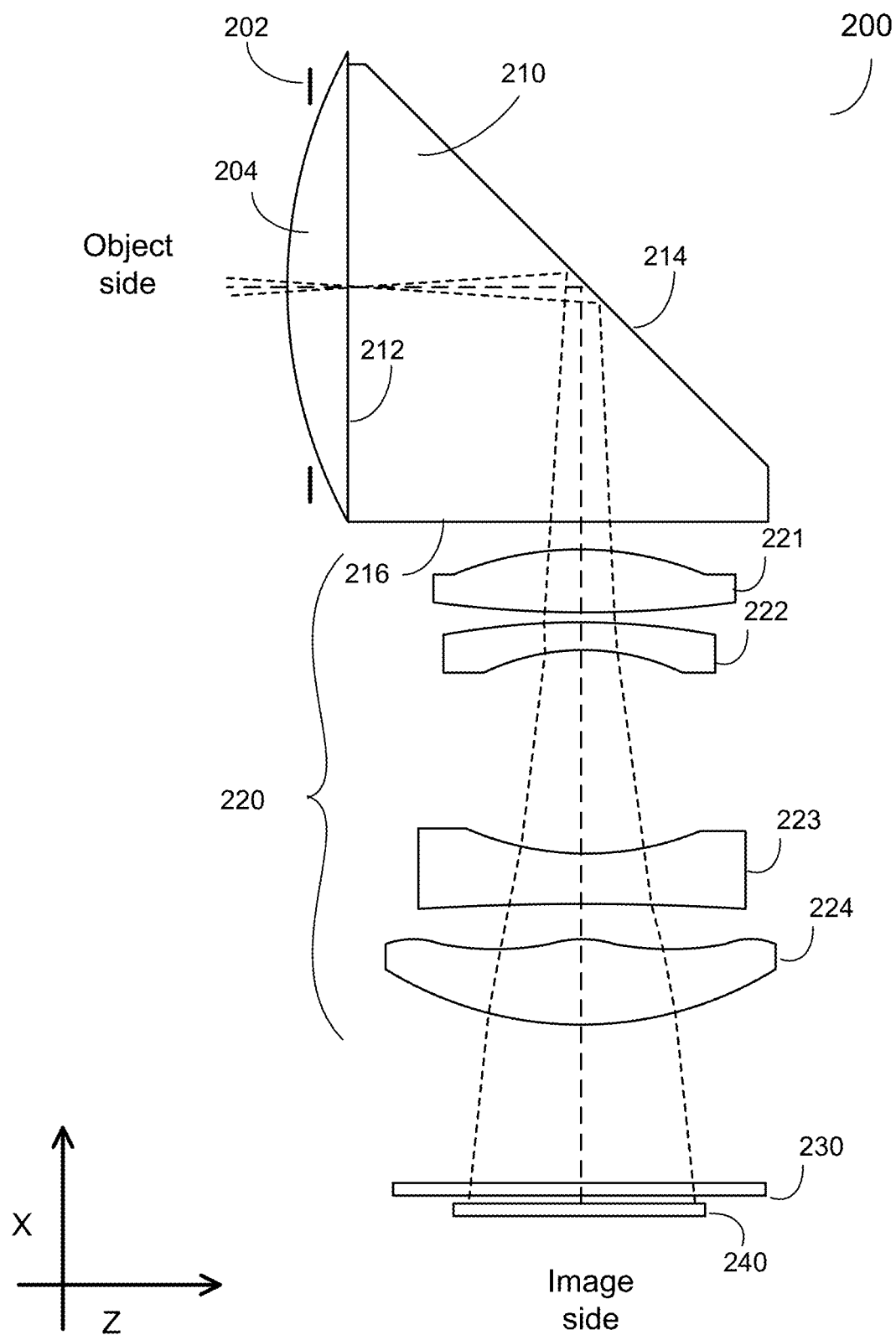
FIG. 2 illustrates an example single fold optical system that includes a glass prism and a plastic lens on the object side of the prism, according to some embodiments.
Figure 3:
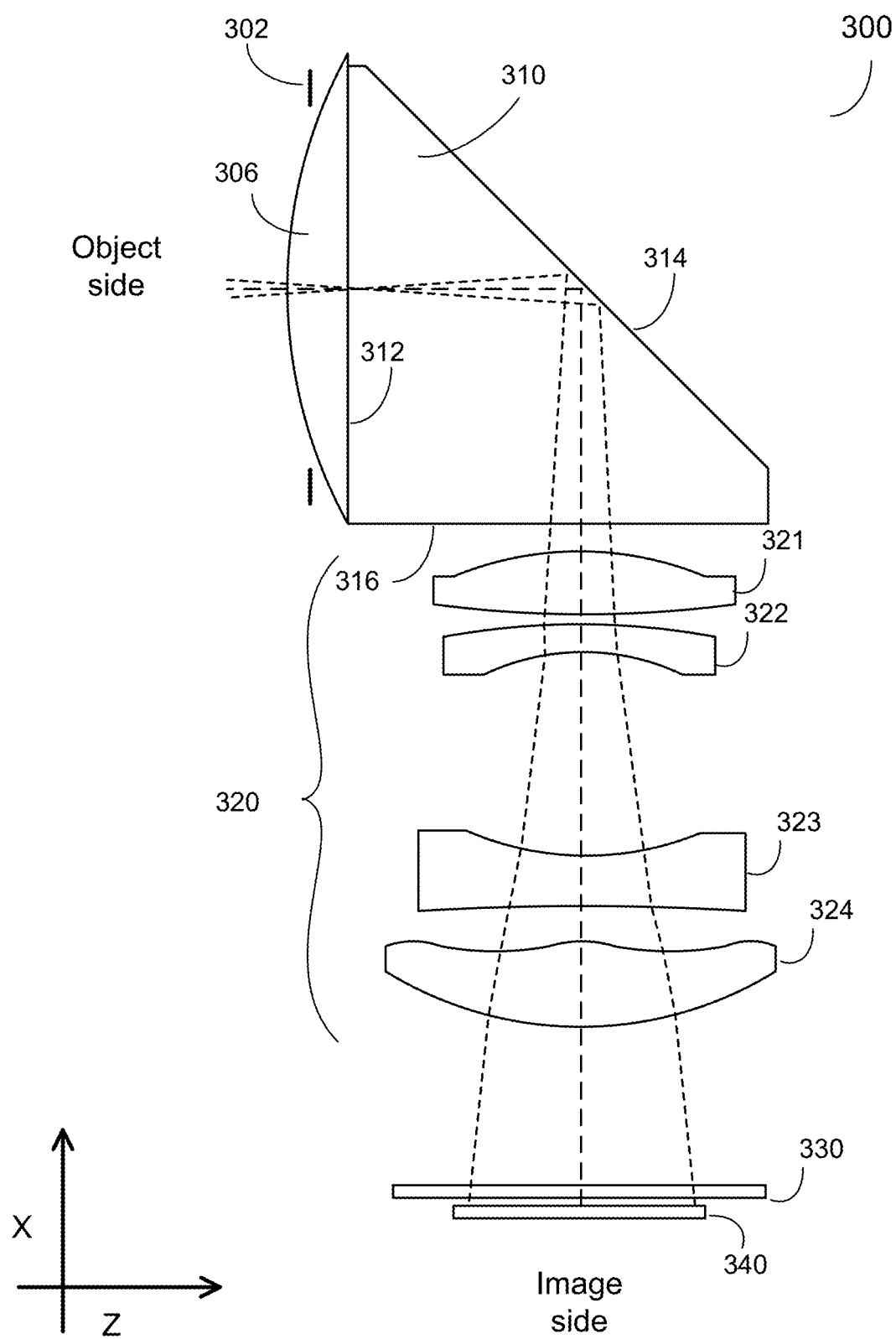
FIG. 3 illustrates an example single fold optical system that includes a glass prism and a glass lens on the object side of the prism, according to some embodiments.

FIGS. 1 through 3 illustrate side cutaway views of example embodiments of single fold optical systems as described herein. As shown in FIGS. 1 through 3, the single fold optical system may include:

- a first lens group that includes a power prism formed of an optical plastic material with an aspherical object side surface as shown in FIG. 1, or that includes a triangular glass prism with a positive lens formed of an optical plastic or glass material having an aspherical object side surface and a flat or plano image side surface attached to the object side surface of the prism as shown in FIGS. 2 and 3; and
- a second lens group that includes two or more refractive lens elements (four, in these embodiments). The refractive lenses in the second lens group may be formed of optical plastic or glass materials. In some embodiments, all of the refractive lenses in the second lens group may be formed of the same material. In some embodiments, at least two of the refractive lenses in the second lens group may be formed of different materials.

In some embodiments of the single fold optical system, the first (object side) surface of the first lens group is aspherical, and the angle between the principal ray that passes through the first surface of the first lens group and the principal ray at an image plane formed on the image side of the second lens group may be, but is not necessarily, less than 90 degrees.

Embodiments of the single fold optical system may satisfy the following conditional expression:

$0.6 < B/A < 2.3$, where A is the power of the total optical system, and B is the power of the first lens group. If B/A is larger than the range expressed in the conditional expression, the amount of sag may be too large to manufacture. On the other hand, if B/A is smaller than the range expressed in the conditional expression, the X-length of optical system cannot be reduced effectively.

Embodiments of the single fold optical system may satisfy the following conditional expression:

$-0.2 < CD < 0.1$, where C is the power of the second lens group, and D is the length of the second lens group. CD applies to the sensitivity of the second lens group. If CD is not within the range expressed in the conditional expression, the tolerance of second lens group may not be good and/or the size (length) of the second lens group may be enlarged.

In some embodiments, the prism in the first lens group is composed of an optical material with an Abbe number $V_d$ that satisfies the following condition:

$V_d > 50$.

Embodiments of the single fold optical system as described herein may have a Z-height of <7.3 mm, and an X-length of <18 mm.

In some embodiments, one or more of the optical elements in the optical system may be formed using an injection molding process. However, in some embodiments, other methods may be used to form one or more of these elements (e.g., 3D printing, extrusion, blow molding, casting, rotomolding, die cast, overmolding, compression molding, computer numerical control (CNC) machining, thermoforming, etc.).

FIG. 1 illustrates a single fold optical system that includes a power prism composed of an optical plastic, according to some embodiments. Optical system 100 may include a power prism 110 (also referred to as a first lens group) and a lens stack 120 (also referred to as a second lens group) that includes two or more refractive lenses. In this example, lens stack 120 includes four refractive lenses: lens 121, lens 122, lens 123, and lens 124. Note, however, that some embodiments may include more or fewer lenses in lens stack 120. An aperture stop 102 may be located at or near the object side of the power prism 110.

The power prism 110 may be formed of an optical plastic material. In some embodiments, the object side surface 112 of the prism 110 is a curved aspherical surface that provides positive refractive power for the prism 110. A second surface 114 of the prism 110 is a flat or plano surface that reflects, via total internal reflection (TIR) or via a mirror coating, light received from an object field through the object side surface 112 of the prism 110 to thus fold the optical axis of the optical system 100. The light reflected by the second surface 114 exits the prism 110 through a third flat or plano surface 116 to a first lens 121 in the lens stack 120. The lenses in the lens stack 120 then refract the light to form an image at an image plane.

FIG. 1 shows an example lens stack 120 that includes four refractive lenses: lens 121 with positive refractive power, lens 122 with negative refractive power, lens 123 with negative refractive power, and lens 124 with positive refractive power. Note, however, that some embodiments may include more or fewer lenses in lens stack 120. In addition, the material, shape, power, power order, position, and distance between the lenses is given by way of example, and is not intended to be limiting.

The single fold optical system 100 of FIG. 1 may form an image at an image plane at or near a surface of an image sensor 140 located on the image side of the lens stack 120. In some embodiments, an infrared (IR) filter 130 may be located between lens stack 120 and the image sensor 140. The optical system 100, sensor 140, and filter 130 (if present) may be components of a camera that may, for example, be used as a small form factor camera in mobile multipurpose devices such as smartphones and tablet or pad devices.

FIG. 2 illustrates an example single fold optical system that includes a glass prism and a plastic lens on the object side of the prism, according to some embodiments. Optical system 200 may include a lens 204 formed of an optical plastic material and a prism 210 formed of an optical glass material (collectively referred to as a first lens group) and a lens stack 220 (also referred to as a second lens group) that includes two or more refractive lenses. In this example, lens stack 220 includes four refractive lenses: lens 221, lens 222, lens 223, and lens 224. Note, however, that some embodiments may include more or fewer lenses in lens stack 220. An aperture stop 202 may be located at or near the object side of the lens 204.

The prism 210 may be formed of an optical glass material. The object side surface 212 of the prism 210 is a flat or plano surface. A plastic lens 204 with positive refractive power may be attached to the object side surface 212 of the prism 210, for example with an adhesive material. The object side surface of lens 204 may be a spherical or aspherical convex surface; the image side surface of lens 204 is a flat or plano surface. A second surface 214 of the prism 210 is a flat or plano surface that reflects, via total internal reflection (TIR) or via a mirror coating, light received from an object field through the object side surface 212 of the prism 210 to thus fold the optical axis of the optical system 200. The light reflected by the second surface 214 exits the prism 210 through a third flat or plano surface 216 to a first lens 221 in the lens stack 220. The lenses in the lens stack 220 then refract the light to form an image at an image plane.

FIG. 2 shows an example lens stack 220 that includes four refractive lenses: lens 221 with positive refractive power, lens 222 with negative refractive power, lens 223 with negative refractive power, and lens 224 with positive refractive power. Note, however, that some embodiments may include more or fewer lenses in lens stack 220. In addition, the material, shape, power, power order, position, and distance between the lenses is given by way of example, and is not intended to be limiting.

The single fold optical system 200 of FIG. 2 may form an image at an image plane at or near a surface of an image sensor 240 located on the image side of the lens stack 220. In some embodiments, an infrared (IR) filter 230 may be located between lens stack 220 and the image sensor 240. The optical system 200, sensor 240, and filter 230 (if present) may be components of a camera that may, for example, be used as a small form factor camera in mobile multipurpose devices such as smartphones and tablet or pad devices.

FIG. 3 illustrates an example single fold optical system that includes a glass prism and a glass lens on the object side of the prism, according to some embodiments. Optical system 300 may include a lens 304 formed of an optical glass material and a prism 310 formed of an optical glass material (collectively referred to as a first lens group) and a lens stack 320 (also referred to as a second lens group) that includes two or more refractive lenses. In this example, lens stack 320 includes four refractive lenses: lens 321, lens 322, lens 323, and lens 324. Note, however, that some embodiments may include more or fewer lenses in lens stack 320. An aperture stop 302 may be located at or near the object side of the lens 304.

The prism 310 may be formed of an optical glass material. The object side surface 312 of the prism 310 is a flat or plano surface. A glass lens 304 with positive refractive power may be attached to the object side surface 312 of the prism 310, for example with an adhesive material. The object side surface of lens 304 may be a spherical or aspherical convex surface; the image side surface of lens 304 is a flat or plano surface. A second surface 314 of the prism 310 is a flat or plano surface that reflects, via total internal reflection (TIR) or via a mirror coating, light received from an object field through the object side surface 312 of the prism 310 to thus fold the optical axis of the optical system 300. The light reflected by the second surface 314 exits the prism 310 through a third flat or plano surface 316 to a first lens 321 in the lens stack 320. The lenses in the lens stack 320 then refract the light to form an image at an image plane.

FIG. 3 shows an example lens stack 320 that includes four refractive lenses: lens 321 with positive refractive power, lens 322 with negative refractive power, lens 323 with negative refractive power, and lens 324 with positive refractive power. Note, however, that some embodiments may include more or fewer lenses in lens stack 320. In addition, the material, shape, power, power order, position, and distance between the lenses is given by way of example, and is not intended to be limiting.

The single fold optical system 300 of FIG. 3 may form an image at an image plane at or near a surface of an image sensor 340 located on the image side of the lens stack 320. In some embodiments, an infrared (IR) filter 330 may be located between lens stack 320 and the image sensor 340. The optical system 300, sensor 340, and filter 330 (if present) may be components of a camera that may, for example, be used as a small form factor camera in mobile multipurpose devices such as smartphones and tablet or pad devices.

Figure 4:
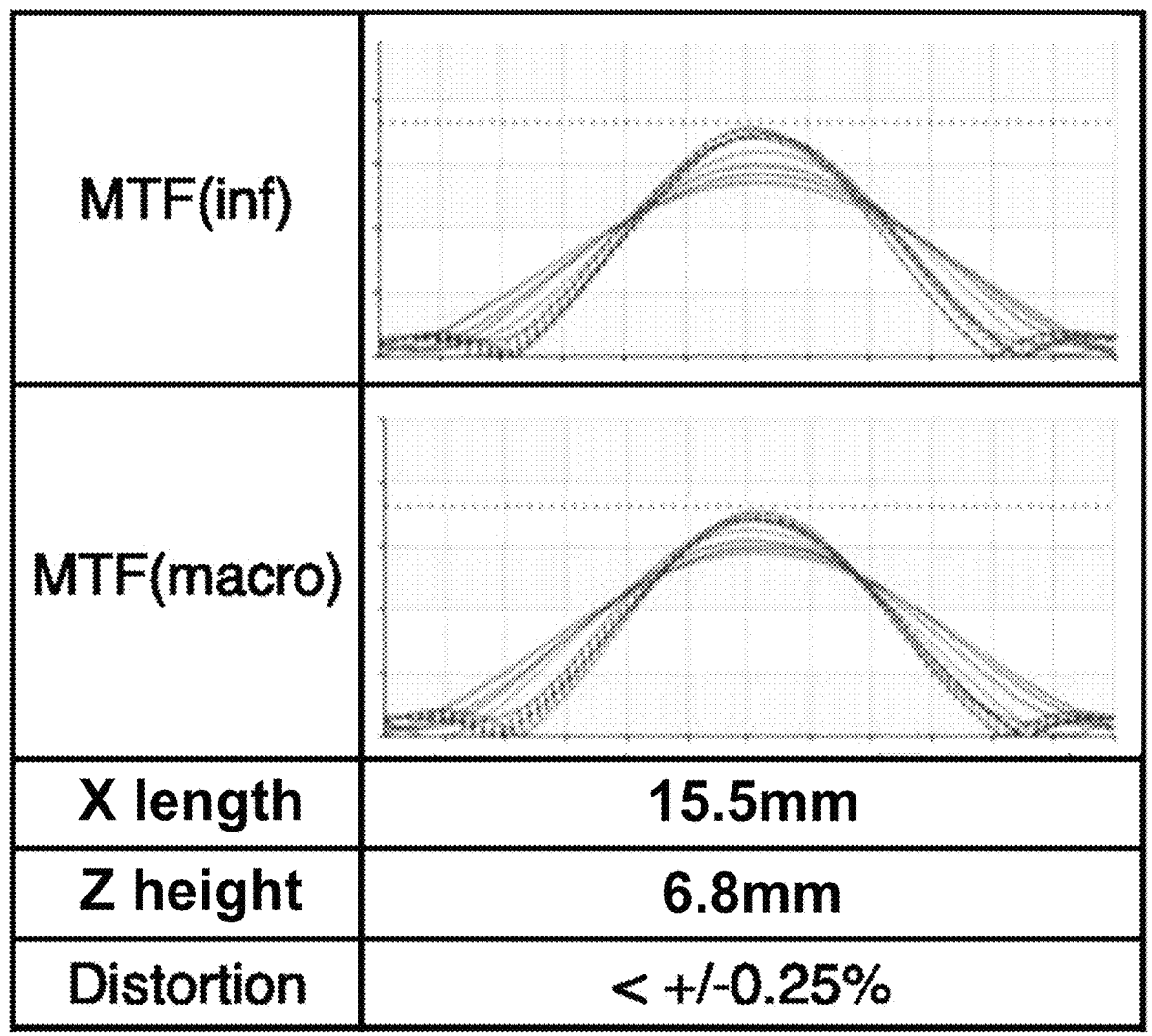
FIG. 4 illustrates example optical characteristics and performance metrics of an example optical system as illustrated in FIG. 1.

FIG. 4 illustrates example optical characteristics and performance metrics of an example optical system as illustrated in FIG. 1. The example optical system may have an X length of 15.5 millimeters (mm), and a Z height of 6.8 mm. Distortion of the optical systems may be <+/−0.25%. The graphs show the modulation transfer function (MTF) of the single fold optical systems at infinity (inf) and at macro.

Figure 5A:
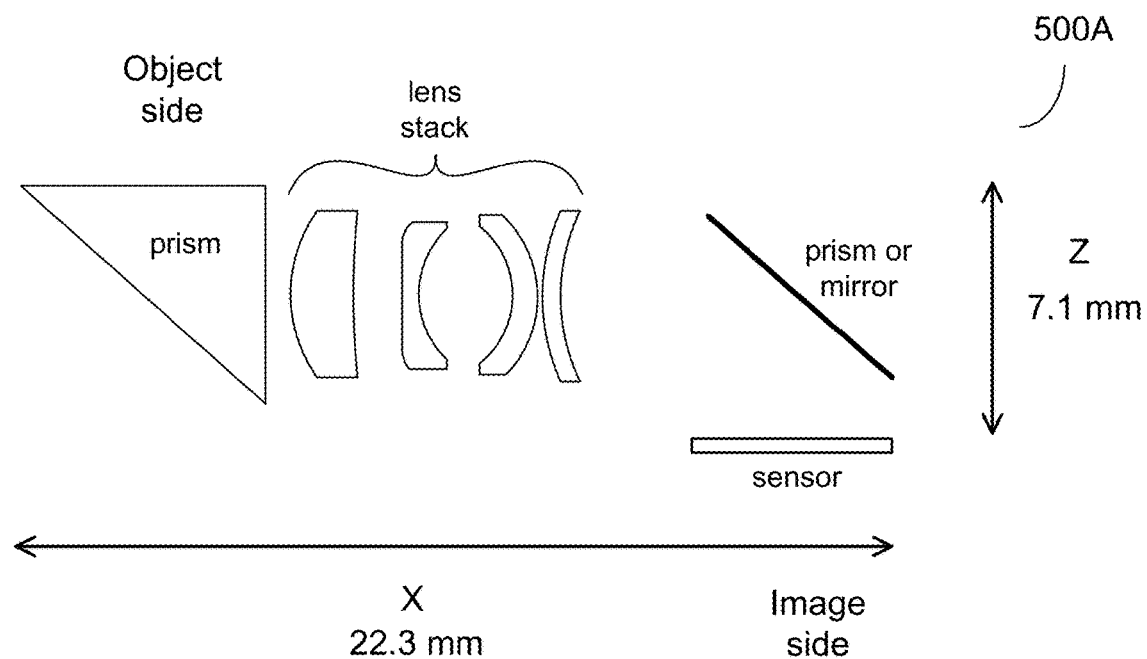
FIGS. 5A and 5B compare a double fold optical system to a single fold optical system, according to some embodiments.
Figure 5B:
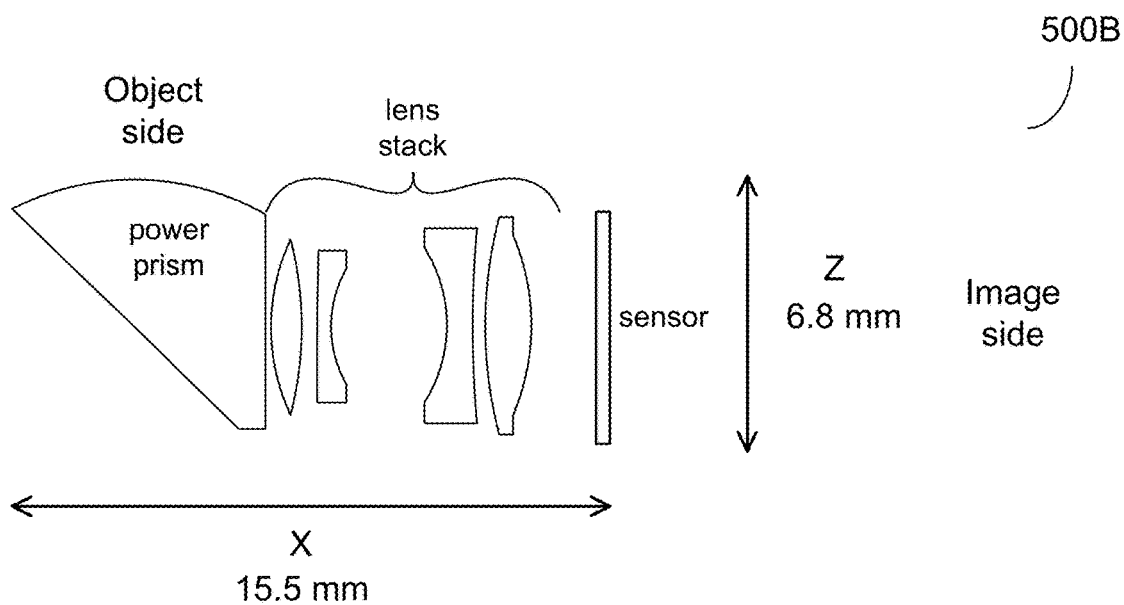

FIGS. 5A and 5B compare a double fold optical system to a single fold optical system, according to some embodiments. FIG. 5A shows an example conventional double folded optical system 500A that includes, in order from an object side to an image side, a first prism that folds the optical axis a first time, a lens stack, and a second prism or mirror that folds the optical axis a second time; an image is formed at an image plane at or near a sensor. Z-height of the optical system 500A may be about 7.1 mm, while X-length may be about 22.3 mm. FIG. 5B shows an example embodiment of a single fold optical system 500B as described herein that includes, in order from an object side to an image side, a first lens group (power prism) that folds the optical axis, and a second lens group (lens stack) that refracts light received from the first lens group to form an image at an image plane at or near a sensor. Z-height of the optical system 500B may be about 6.8 mm, while X-length may be about 15.5 mm.

As shown in FIGS. 5A and 5B, embodiments of the single fold optical system as described herein may provide an optical system with long focal length and reduced thickness (Z-height) and X-length when compared to a conventional double folded optical system with similar optical characteristics. In general, the Z-height of double folded optics is defined by the prism size and mechanical back focus. Embodiments of the single fold optical system may provide a long mechanical back focus without increasing, or even decreasing, the Z-height of the optical system. Providing power on the prism may reduce the optical total length and reduce the X-length of the optical system.

FIGS. 6A-6B, 7A-7B, 8A-8B, and 9 illustrate side cutaway views of additional example embodiments of single fold optical systems as described herein.

Figure 6A:
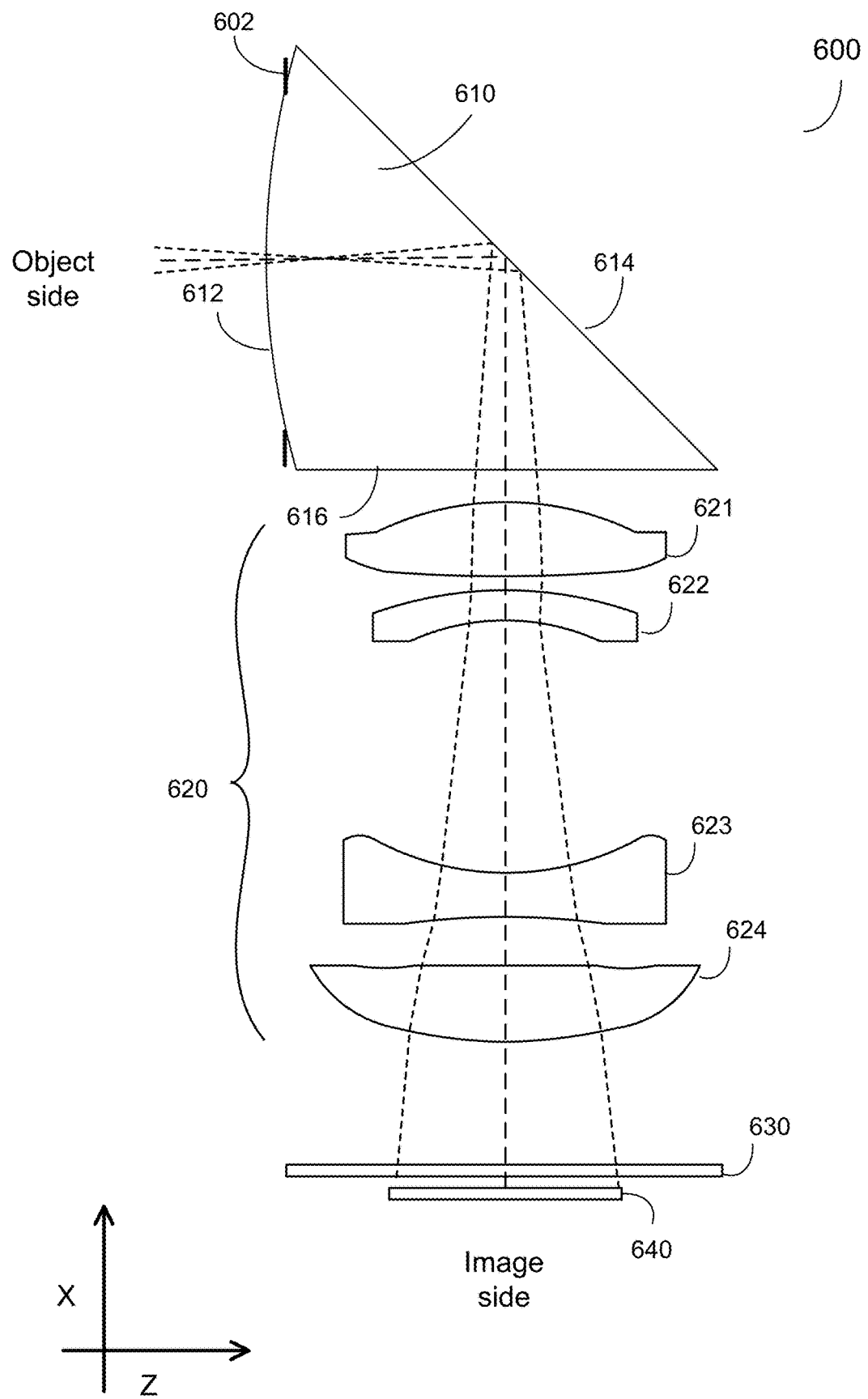
FIG. 6A illustrates another example single fold optical system that includes a power prism composed of an optical plastic, according to some embodiments.

FIG. 6A illustrates another example single fold optical system that includes a power prism composed of an optical plastic, according to some embodiments. Optical system 600 may include a power prism 610 (also referred to as a first lens group) and a lens stack 620 (also referred to as a second lens group) that includes four refractive lenses: lens 621, lens 622, lens 623, and lens 624. Note, however, that some embodiments may include more or fewer lenses in lens stack 620. An aperture stop 602 may be located at or near the object side of the power prism 610.

The power prism 610 may be formed of an optical plastic material. In some embodiments, the object side surface 612 of the prism 610 is a curved aspherical surface that provides positive refractive power for the prism 610. A second surface 614 of the prism 610 is a flat or plano surface that reflects, via total internal reflection (TIR) or via a mirror coating, light received from an object field through the object side surface 612 of the power prism 610 to thus fold the optical axis of the optical system 600. The light reflected by the second surface 614 exits the prism 610 through a third flat or plano surface 616 to a first lens 621 in the lens stack 620. The lenses in the lens stack 612 then refract the light to form an image at an image plane.

FIG. 6A shows an example lens stack 620 that includes four refractive lenses: lens 621 with positive refractive power, lens 622 with negative refractive power, lens 623 with negative refractive power, and lens 624 with positive refractive power. Note, however, that some embodiments may include more or fewer lenses in lens stack 620. In some embodiments, at least one surface of at least one of the lenses in the second lens group may be an aspherical surface. The refractive lenses in the second lens group may be formed of optical plastic or glass materials. In addition, the material, shape, power, power order, position, and distance between the lenses is given by way of example, and is not intended to be limiting.

The single fold optical system 600 of FIG. 6A may form an image at an image plane at or near a surface of an image sensor 640 located on the image side of the lens stack 620. In some embodiments, an infrared (IR) filter 630 may be located between lens stack 620 and the image sensor 640. The optical system 600, sensor 640, and filter 630 (if present) may be components of a camera that may, for example, be used as a small form factor camera in mobile multipurpose devices such as smartphones and tablet or pad devices.

FIG. 6B illustrates optical characteristics and performance metrics of the example optical system 600 illustrated in FIG. 6A. The example optical system 600 may have an X length of 17.2 millimeters (mm), and a Z height of 6.8 mm. Distortion of the optical systems may be <+/−0.25%. The graphs show the modulation transfer function (MTF) of the single fold optical systems at infinity (inf) and at macro.

Figure 7A:
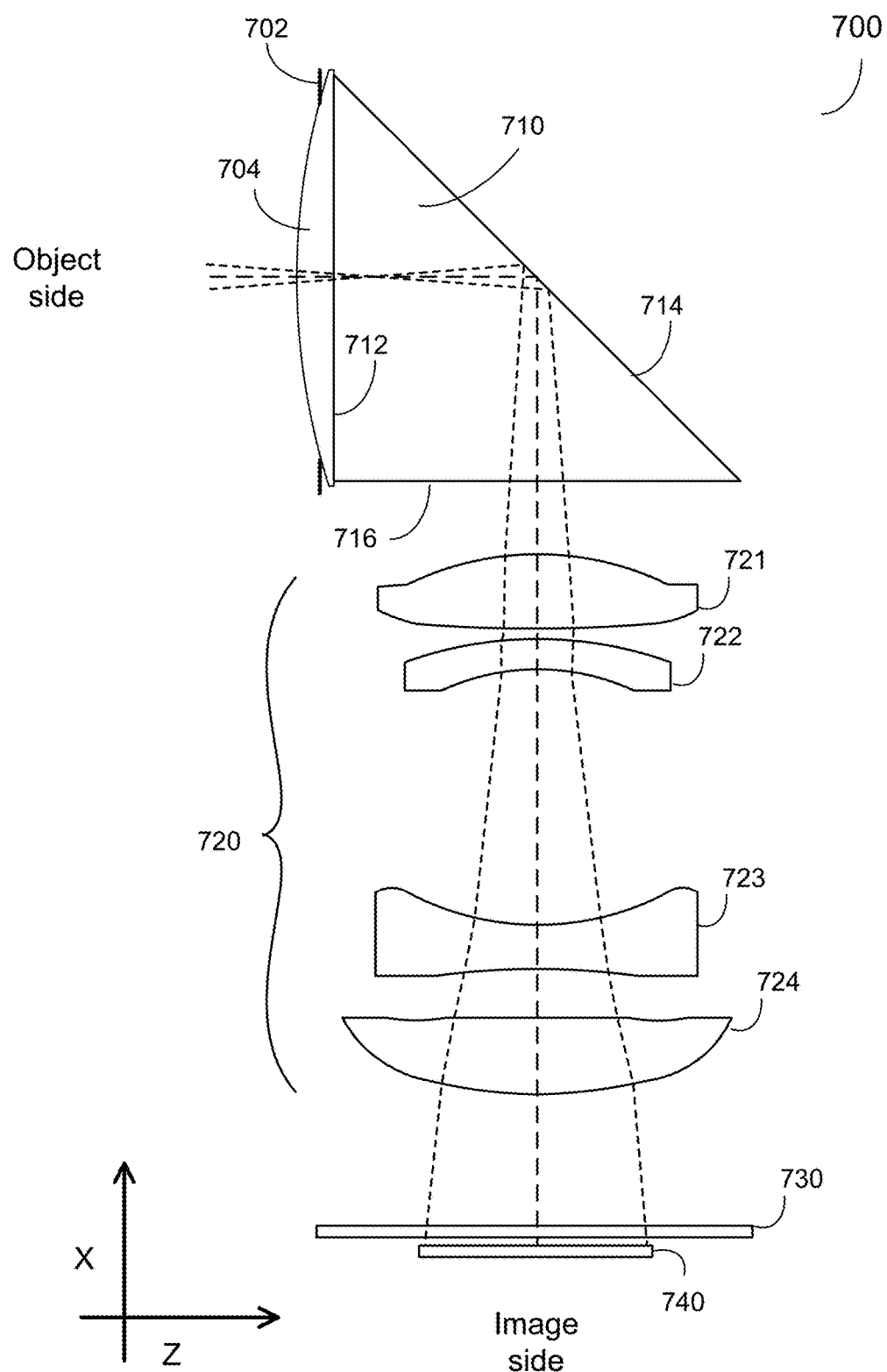
FIG. 7A illustrates another example single fold optical system that includes a glass prism and a plastic lens on the object side of the prism, according to some embodiments.

FIG. 7A illustrates another example single fold optical system that includes a glass prism and a plastic lens on the object side of the prism, according to some embodiments. Optical system 700 may include a lens 704 formed of an optical plastic material and a prism 710 formed of an optical glass material (collectively referred to as a first lens group) and a lens stack 720 (also referred to as a second lens group) that includes four refractive lenses: lens 721, lens 722, lens 723, and lens 724. Note, however, that some embodiments may include more or fewer lenses in lens stack 720. An aperture stop 702 may be located at or near the object side of the lens 704.

The prism 710 may be formed of an optical glass material. The object side surface 712 of the prism 710 is a flat or plano surface. A plastic lens 704 with positive refractive power may be attached to the object side surface 712 of the prism 710, for example with an adhesive material. The object side surface of lens 704 may be a spherical or aspherical convex surface; the image side surface of lens 704 is a flat or plano surface. A second surface 714 of the prism 710 is a flat or plano surface that reflects, via total internal reflection (TIR) or via a mirror coating, light received from an object field through the object side surface 712 of the prism 710 to thus fold the optical axis of the optical system 700. The light reflected by the second surface 714 exits the prism 710 through a third flat or plano surface 716 to a first lens 721 in the lens stack 720. The lenses in the lens stack 720 then refract the light to form an image at an image plane.

FIG. 7A shows an example lens stack 720 that includes four refractive lenses: lens 721 with positive refractive power, lens 722 with negative refractive power, lens 723 with negative refractive power, and lens 724 with positive refractive power. Note, however, that some embodiments may include more or fewer lenses in lens stack 720. In some embodiments, at least one surface of at least one of the lenses in the second lens group may be an aspherical surface. The refractive lenses in the second lens group may be formed of optical plastic or glass materials. In addition, the material, shape, power, power order, position, and distance between the lenses is given by way of example, and is not intended to be limiting.

The single fold optical system 700 of FIG. 7A may form an image at an image plane at or near a surface of an image sensor 740 located on the image side of the lens stack 720. In some embodiments, an infrared (IR) filter 730 may be located between lens stack 720 and the image sensor 740. The optical system 700, sensor 740, and filter 730 (if present) may be components of a camera that may, for example, be used as a small form factor camera in mobile multipurpose devices such as smartphones and tablet or pad devices.

Figure 7B:
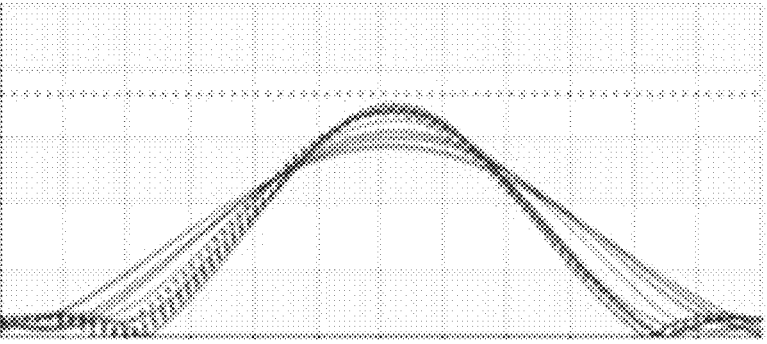
FIG. 7B illustrates optical characteristics and performance metrics of the example optical system illustrated in FIG. 7A.
Figure 7B:
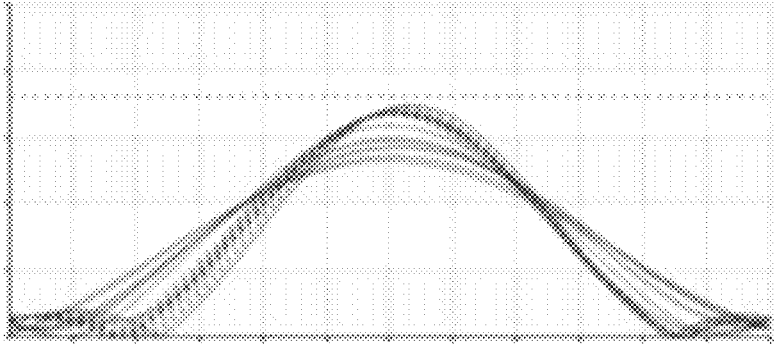

FIG. 7B illustrates optical characteristics and performance metrics of the example optical system 700 illustrated in FIG. 7A. The example optical system 700 may have an X length of 17.2 millimeters (mm), and a Z height of 6.5 mm. Distortion of the optical systems may be <+/−0.25%. The graphs show the modulation transfer function (MTF) of the single fold optical systems at infinity (inf) and at macro.

Figure 8A:
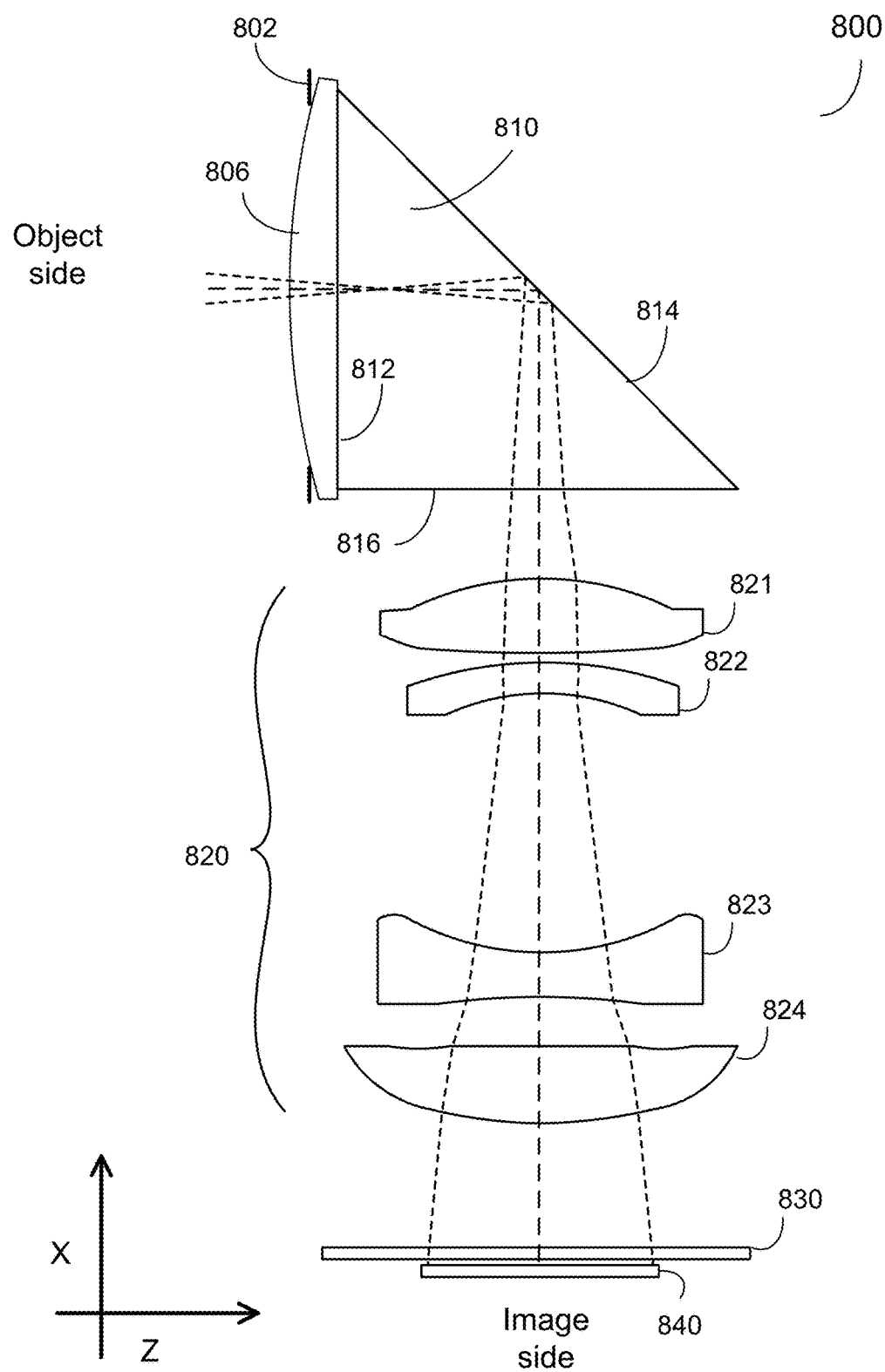
FIG. 8A illustrates another example single fold optical system that includes a glass prism and a glass lens on the object side of the prism, according to some embodiments.

FIG. 8A illustrates another example single fold optical system that includes a glass prism and a glass lens on the object side of the prism, according to some embodiments. Optical system 800 may include a lens 804 formed of an optical glass material and a prism 810 formed of an optical glass material (collectively referred to as a first lens group) and a lens stack 820 (also referred to as a second lens group) that includes four refractive lenses: lens 821, lens 822, lens 823, and lens 824. Note, however, that some embodiments may include more or fewer lenses in lens stack 820. An aperture stop 802 may be located at or near the object side of the lens 804.

The prism 810 may be formed of an optical glass material. The object side surface 812 of the prism 810 is a flat or plano surface. A glass lens 804 with positive refractive power may be attached to the object side surface 812 of the prism 8710, for example with an adhesive material. The object side surface of lens 804 may be a spherical or aspherical convex surface; the image side surface of lens 804 is a flat or plano surface. A second surface 814 of the prism 810 is a flat or plano surface that reflects, via total internal reflection (TIR) or via a mirror coating, light received from an object field through the object side surface 812 of the prism 810 to thus fold the optical axis of the optical system 800. The light reflected by the second surface 814 exits the prism 810 through a third flat or plano surface 816 to a first lens 821 in the lens stack 820. The lenses in the lens stack 820 then refract the light to form an image at an image plane.

FIG. 8A shows an example lens stack 820 that includes four refractive lenses: lens 821 with positive refractive power, lens 822 with negative refractive power, lens 823 with negative refractive power, and lens 824 with positive refractive power. Note, however, that some embodiments may include more or fewer lenses in lens stack 820. In some embodiments, at least one surface of at least one of the lenses in the second lens group may be an aspherical surface. The refractive lenses in the second lens group may be formed of optical plastic or glass materials. In addition, the material, shape, power, power order, position, and distance between the lenses is given by way of example, and is not intended to be limiting.

The single fold optical system 800 of FIG. 8A may form an image at an image plane at or near a surface of an image sensor 840 located on the image side of the lens stack 820. In some embodiments, an infrared (IR) filter 830 may be located between lens stack 820 and the image sensor 840. The optical system 800, sensor 840, and filter 830 (if present) may be components of a camera that may, for example, be used as a small form factor camera in mobile multipurpose devices such as smartphones and tablet or pad devices.

Figure 8B:
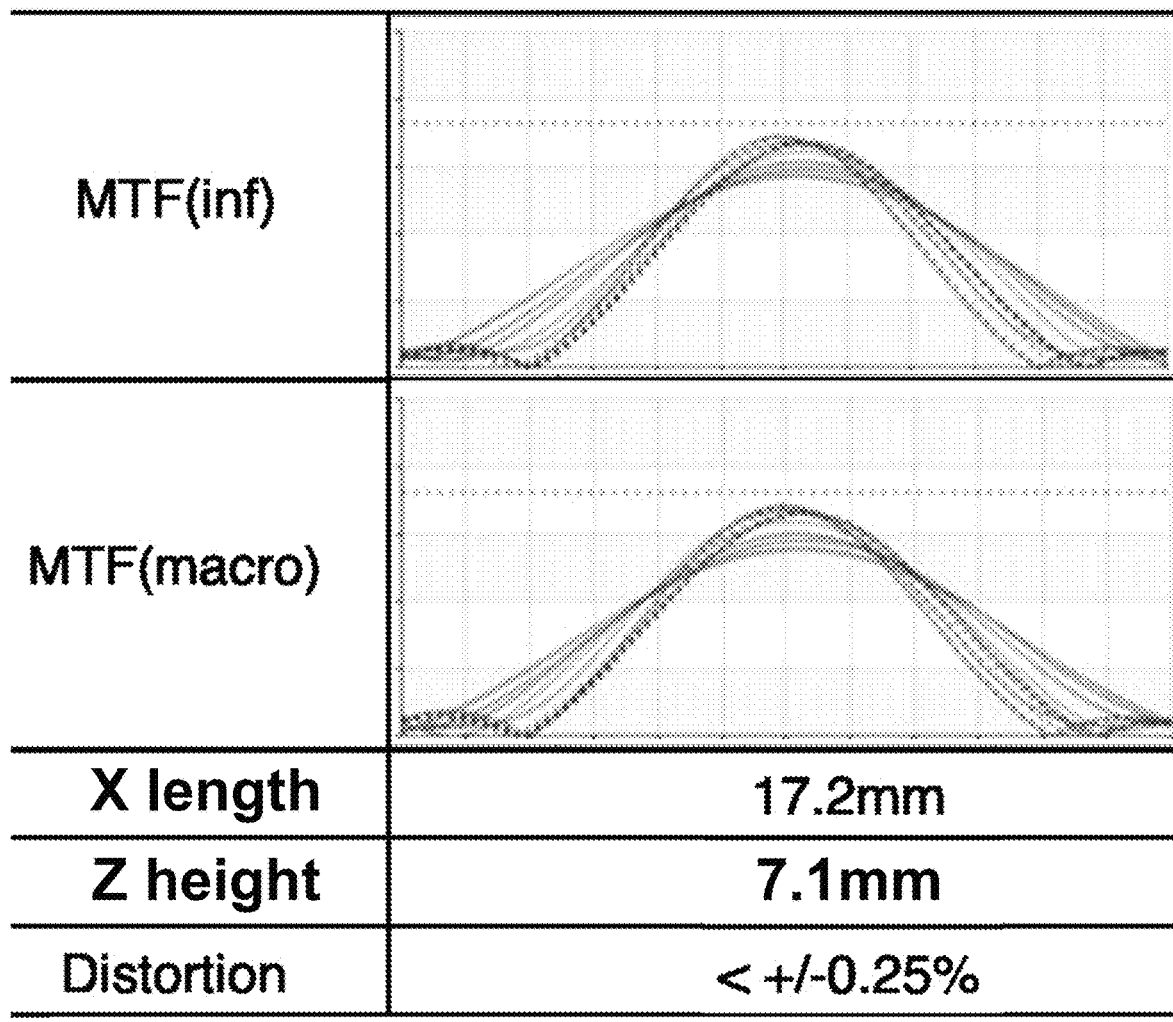
FIG. 8B illustrates optical characteristics and performance metrics of the example optical system illustrated in FIG. 8A.

FIG. 8B illustrates optical characteristics and performance metrics of the example optical system 800 illustrated in FIG. 8A. The example optical system 800 may have an X length of 17.2 millimeters (mm), and a Z height of 7.1 mm. Distortion of the optical systems may be <+/−0.25%. The graphs show the modulation transfer function (MTF) of the single fold optical systems at infinity (inf) and at macro.

Figure 9A:
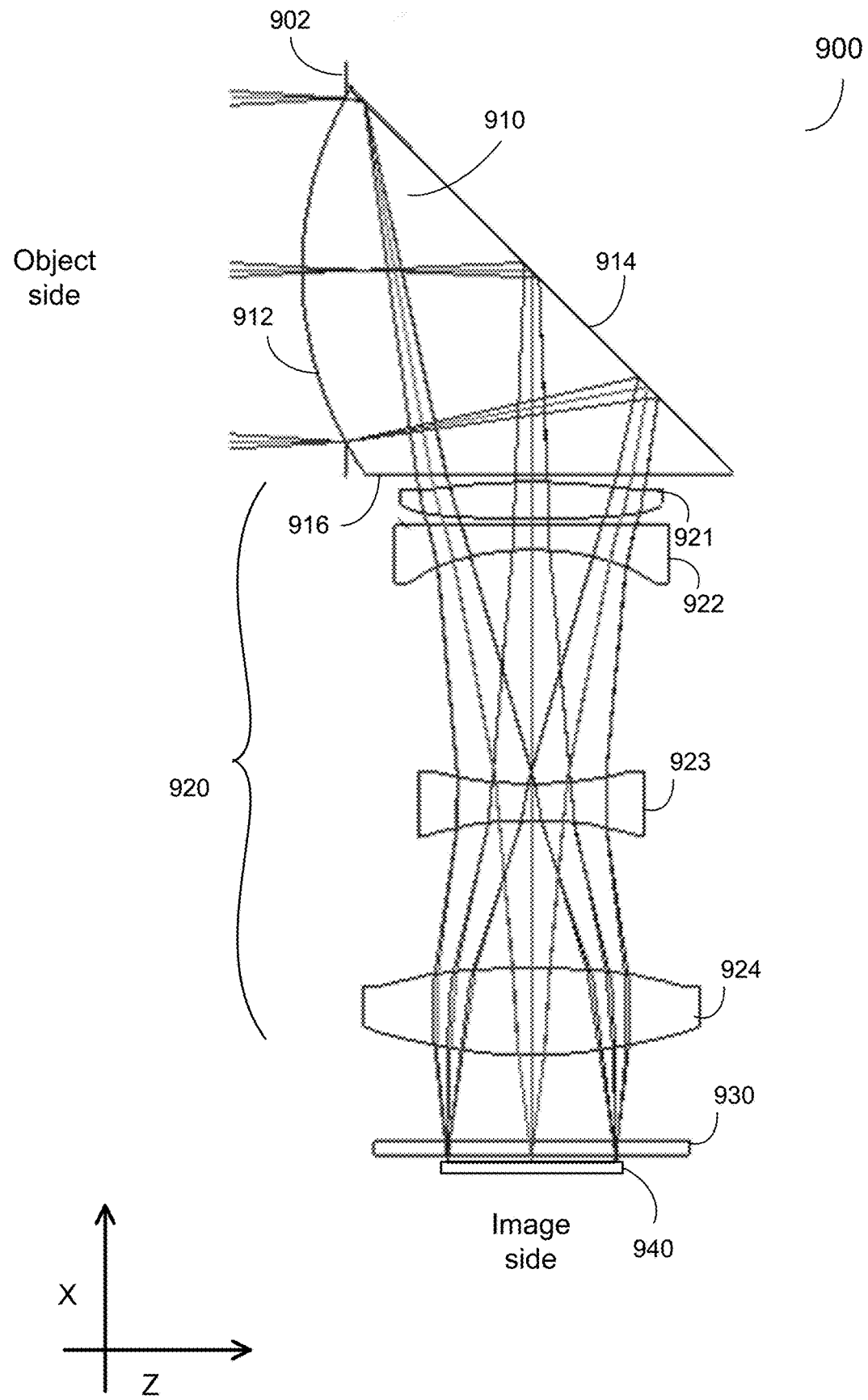
FIG. 9A illustrates another example single fold optical system that includes a power prism, according to some embodiments.

FIG. 9A illustrates another example single fold optical system that includes a power prism, according to some embodiments. Optical system 900 may include a power prism 910 (also referred to as a first lens group) and a lens stack 920 (also referred to as a second lens group) that includes four refractive lenses: lens 921, lens 922, lens 923, and lens 924. Note, however, that some embodiments may include more or fewer lenses in lens stack 920. An aperture stop 902 may be located at or near the object side of the power prism 910.

The power prism 910 may be formed of an optical plastic material. In some embodiments, the object side surface 912 of the prism 910 is a curved aspherical surface that provides positive refractive power for the prism 910. A second surface 914 of the prism 910 is a flat or plano surface that reflects, via total internal reflection (TIR) or via a mirror coating, light received from an object field through the object side surface 912 of the power prism 910 to thus fold the optical axis of the optical system 900. The light reflected by the second surface 914 exits the prism 910 through a third flat or plano surface 916 to a first lens 921 in the lens stack 920. The lenses in the lens stack 912 then refract the light to form an image at an image plane.

FIG. 9A shows an example lens stack 920 that includes four refractive lenses: lens 921 with positive refractive power, lens 922 with negative refractive power, lens 923 with negative refractive power, and lens 924 with positive refractive power. Note, however, that some embodiments may include more or fewer lenses in lens stack 920. In some embodiments, at least one surface of at least one of the lenses in the second lens group may be an aspherical surface. The refractive lenses in the second lens group may be formed of optical plastic or glass materials. In addition, the material, shape, power, power order, position, and distance between the lenses is given by way of example, and is not intended to be limiting.

The single fold optical system 900 of FIG. 9A may form an image at an image plane at or near a surface of an image sensor 940 located on the image side of the lens stack 920. In some embodiments, an infrared (IR) filter 930 may be located between lens stack 920 and the image sensor 940. The optical system 900, sensor 940, and filter 930 (if present) may be components of a camera that may, for example, be used as a small form factor camera in mobile multipurpose devices such as smartphones and tablet or pad devices.

Figure 9B:
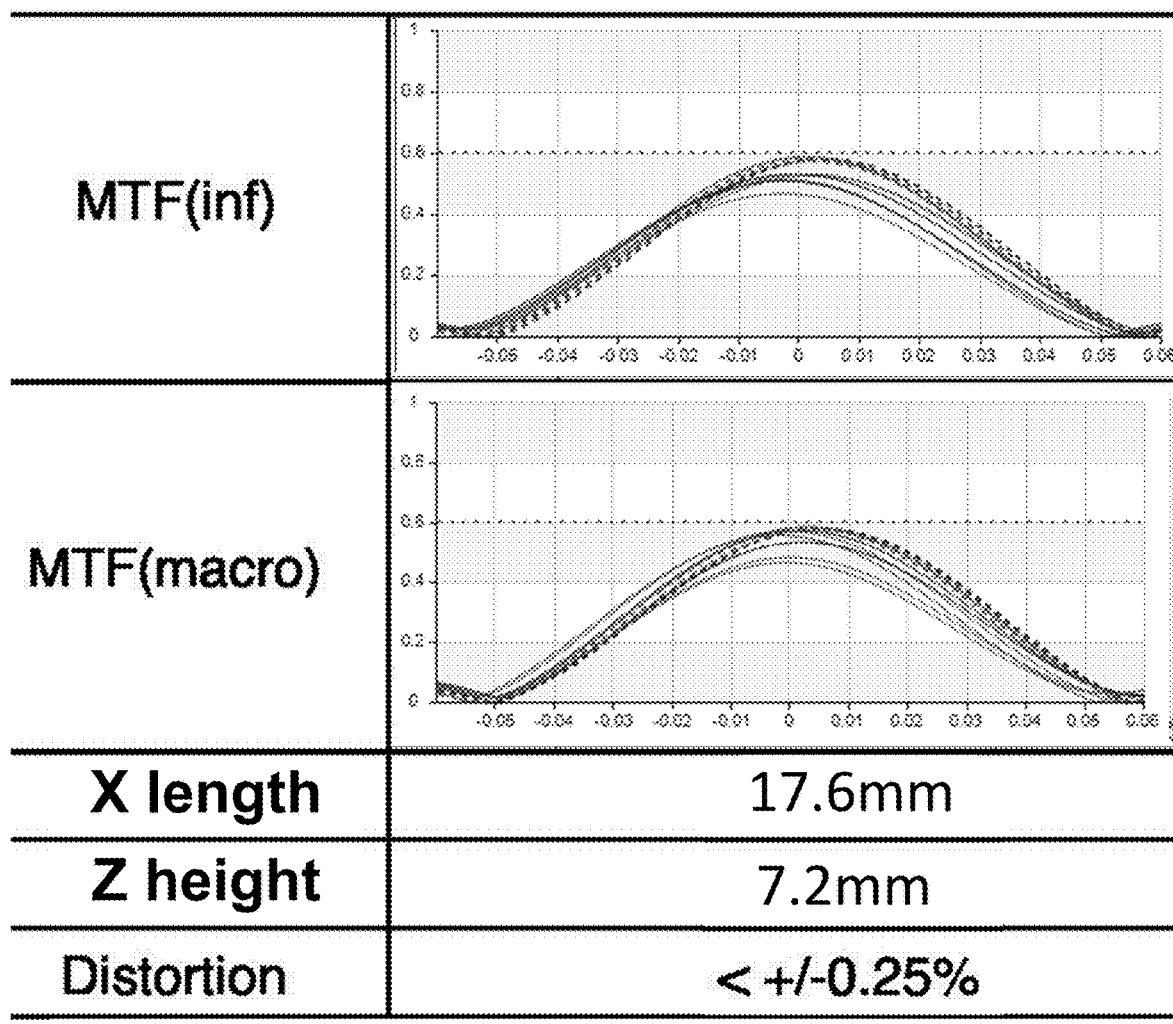
FIG. 9B illustrates optical characteristics and performance metrics of the example optical system illustrated in FIG. 9A.

FIG. 9B illustrates optical characteristics and performance metrics of the example optical system 900 illustrated in FIG. 9A. The example optical system 900 may have an X length of 17.6 millimeters (mm), and a Z height of 7.2 mm. Distortion of the optical systems may be <+/−0.25%. The graphs show the modulation transfer function (MTF) of the single fold optical systems at infinity (inf) and at macro.

Figure 10:
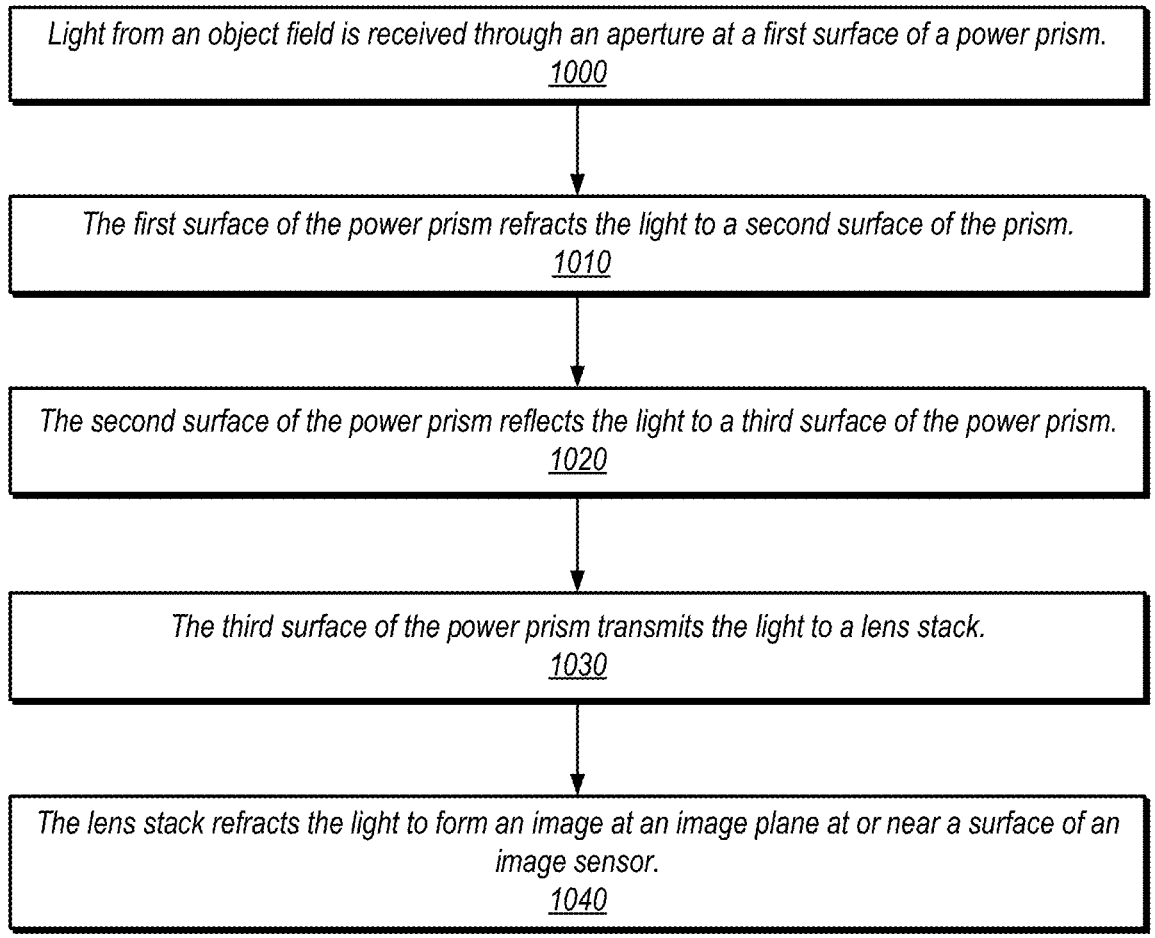
FIG. 10 is a flowchart of a method for capturing images using embodiments of a single fold optical system as illustrated in FIGS. 1 through 9, according to some embodiments.

FIG. 10 is a flowchart of a method for capturing images using embodiments of a single fold optical system as illustrated in FIGS. 1 through 9, according to some embodiments. As indicated at 1000, light from an object field is received through an aperture at a first surface of a power prism. As indicated at 1010, the first surface of the power prism refracts the light to a second (reflective) surface of the power prism. As indicated at 1020, the second surface of the power prism reflects the light to a third surface of the power prism. As indicated at 1030, the third surface of the prism transmits the light to a lens stack. As indicated at 1040, the refractive lenses in the lens stack refract the light to form an image at an image plane at or near a surface of an image sensor. In some embodiments, an infrared filter may be positioned between the lens stack and the image sensor.

Figure 11:
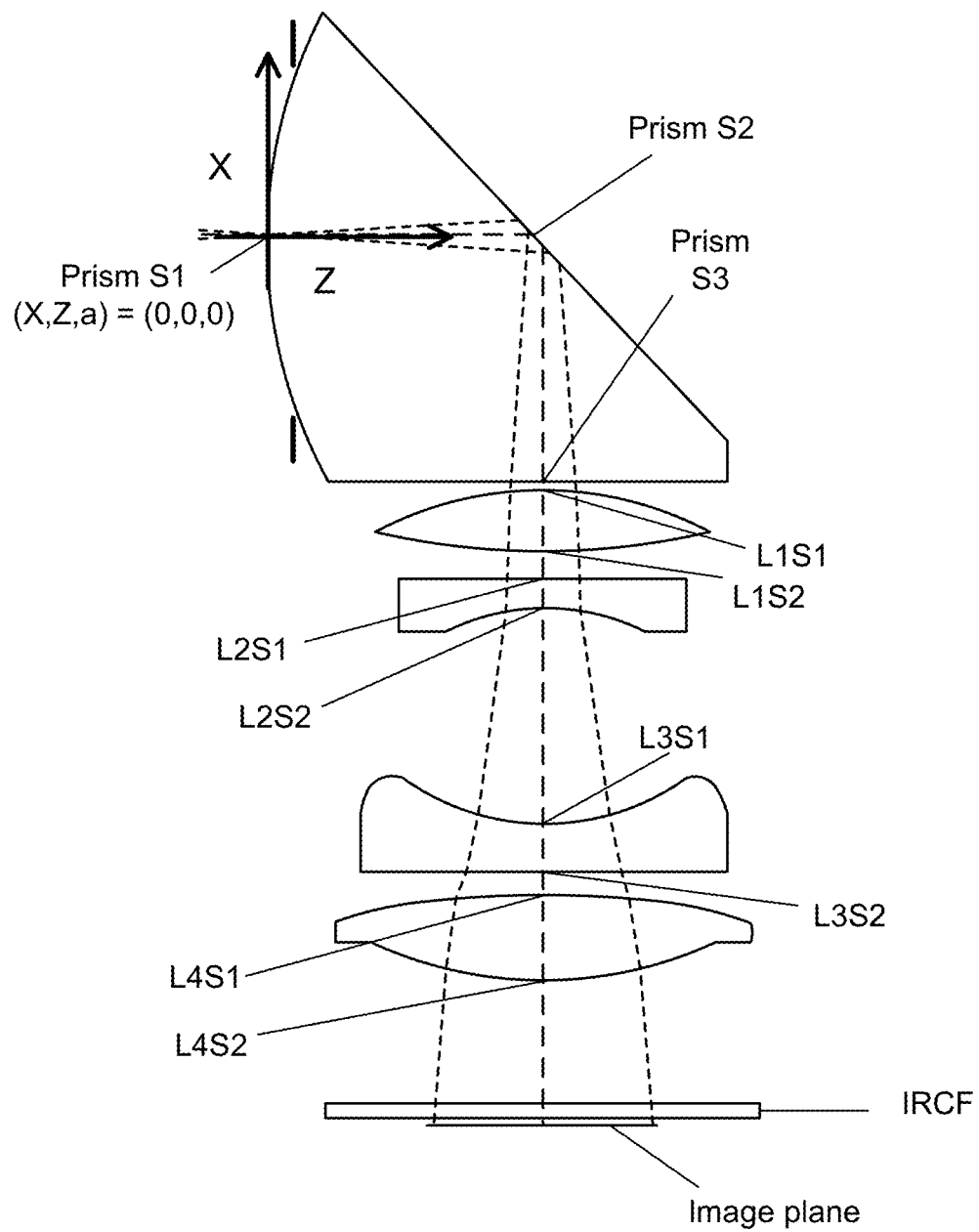
FIG. 11 shows surfaces of an example single fold optical system as referred to in the Tables.

The following tables provide optical and physical characteristics of the example single fold lens systems described herein. FIG. 11 shows surfaces of an example single fold optical system as referred to in the Tables. Each surface location is determined by the global coordinate based on Prism S1.

An aspherical surface may be defined as:

$$z = \frac{\frac{h^2}{r}}{1 + \sqrt{1 - \frac{(1+k)h^2}{r^2}}} + Ah^2 + Bh^2 + Ch^2 + \ldots$$

where $$h = \sqrt{x^2 + y^2}$$

and where radius of curvature r is:
4th order (A);
6th order (B);
8th order (C);
10th order (D);
12th order (E); and
14th order (F).

Table 1 provides ranges of optical and physical characteristics of the example embodiments shown in FIGS. 1, 6A, 7A, 8A, and 9A.

TABLE 1

| Characteristic | Range | FIG. 1 | FIG. 6A | FIG. 7A | FIG. 8A | FIG. 9A |
|---|---|---|---|---|---|---|
| B/A | 0.6-2.3 | 1.24 | 0.81 | 0.81 | 0.81 | 2.10 |
| CD | −0.2-0.1 | −0.128 | 0.047 | 0.047 | 0.046 | −0.106 |
| Vd1 | >50 | 55.97 | 55.73 | 55.73 | 55.73 | 55.73 |
| Z-height | <7.3 | 6.8 | 6.8 | 6.5 | 7.1 | 7.2 |
| X-length | <18 | 15.5 | 17.2 | 17.2 | 17.2 | 17.6 |

Tables 2A through 2F provide optical and physical characteristics for the example single fold optical system as illustrated in FIG. 1.

Table 2A shows all surface positions based on the Prism S1 global coordinate for the example single fold optical system as illustrated in FIG. 1:

TABLE 2A

|  | x | z | angle (α) |
|---|---|---|---|
| aperture | 0 | 0.3 | 0 |
| Prism S1 | 0.000 | 0.000 | 0 |
| Prism S2 | 0.000 | 3.800 | 45 |
| Prism S3 | −3.400 | 3.800 | 90 |
| L1 S1 | −3.500 | 3.800 | 90 |
| L1S2 | −4.320 | 3.800 | 90 |
| L2S1 | −4.712 | 3.800 | 90 |
| L2S2 | −5.102 | 3.800 | 90 |
| L3S1 | −8.070 | 3.800 | 90 |
| L3S4 | −8.737 | 3.800 | 90 |
| L4S1 | −9.070 | 3.800 | 90 |
| L4S2 | −10.225 | 3.800 | 90 |
| IRcut S1 | −11.890 | 3.800 | 90 |
| IRcut S2 | −12.100 | 3.800 | 90 |
| image plane (INF) | −12.200 | 3.800 | 90 |

Tables 2B through 2D show aspherical values for the surfaces of the optical components for the example single fold optical system as illustrated in FIG. 1:

TABLE 2B

|  | Prism S1 | L1S1 | L1S2 |
|---|---|---|---|
| Radius of curvature | 6.7203 | −5.2935 | 14.2603 |
| 4th order | −4.26730E−04 | −2.88851E−03 | −1.48664E−03 |
| 6th order | −1.29339E−05 | −3.95461E−04 | 9.32386E−04 |
| 8th order | −7.66845E−07 | 9.90583E−05 | −6.91378E−05 |
| 10th order | 6.66654E−08 | −1.12263E−05 | −3.43883E−06 |
| 12th order | −5.16169E−09 | 2.23130E−06 | 3.08245E−06 |
| 14th order |  | 4.49321E−07 | −2.03270E−07 |

TABLE 2C

|  | L2S1 | L2S2 | L3S1 |
|---|---|---|---|
| Radius of curvature | −16.1429 | −2.7451 | 3.7738 |
| 4th order | 1.41735E−02 | 1.19869E−02 | 1.31664E−02 |
| 6th order | −6.22662E−04 | −2.57413E−03 | −2.21852E−03 |
| 8th order | −1.17735E−04 | 4.39224E−04 | 6.21870E−04 |
| 10th order | −3.12763E−05 | −5.79999E−04 | −1.72582E−04 |
| 12th order | −4.96180E−07 | 2.09980E−04 |  |
| 14th order | −4.53847E−07 | −4.24766E−05 |  |

TABLE 2D

|  | L3S2 | L4S1 | L4S2 |
|---|---|---|---|
| Radius of curvature | −10.1283 | −15.1458 | 5.1079 |
| 4th order | 1.57161E−02 | 3.58922E−03 | 266831E−03 |
| 6th order | −2.19959E−03 | −5.01016E−04 | −8.20924E−04 |
| 8th order | 3.69265E−04 | −8.42268E−05 | 9.61069E−05 |
| 10th order | −4.01054E−05 | 3.08659E−05 | −2.99277E−05 |
| 12th order |  | −4.44401E−06 | 4.12343E−06 |
| 14th order |  | 2.08392E−07 | −2.22745E−07 |

Table 2E shows material characteristics of the optical components for the example single fold optical system as illustrated in FIG. 1. Nd refers to refractive index, and Vd refers to Abbe number of the material. L1-L4 refer to the four lenses in the second lens group from the object side to the image side of the optical system:

TABLE 2E

|  | Prism | L1 | L2 | L3 | L4 |
|---|---|---|---|---|---|
| Nd | 1.544 | 1.544 | 1.671 | 1.544 | 1.671 |
| Vd | 55.97 | 55.97 | 19.23 | 55.97 | 19.23 |

Table 2F shows optical specifications for the example single fold optical system as illustrated in FIG. 1. EFL is effective focal length, and Fno is the F-number of the optical system:

TABLE 2F

| EFL | 15.3 |
|---|---|
| Fno | 3.0 |
| semi-sensor diagonal | 2.52 |
| Macro distance | 80 cm |

Tables 3A through 3F provide optical and physical characteristics for the example single fold optical system as illustrated in FIG. 6A.

Table 3A shows all surface positions based on the Prism S1 global coordinate for the example single fold optical system as illustrated in FIG. 6A:

TABLE 3A

|  | x | z | angle (α) |
|---|---|---|---|
| aperture | 0 | 0.28 | 0 |
| Prism S1 | 0.000 | 0.000 | 0 |
| Prism S2 | 0.000 | 3.450 | 45 |
| Prism S3 | −3.100 | 3.450 | 90 |
| L1 S1 | −3.600 | 3.450 | 90 |
| L1S2 | −4.645 | 3.450 | 90 |
| L2S1 | −4.898 | 3.450 | 90 |
| L252 | −5.288 | 3.450 | 90 |
| L3S1 | −8.974 | 3.450 | 90 |
| L3S4 | −9.634 | 3.450 | 90 |
| L4S1 | −10.375 | 3.450 | 90 |
| L4S2 | −11.475 | 3.450 | 90 |
| IRcut S1 | −13.359 | 3.450 | 90 |
| IRcut S2 | −13.569 | 3.450 | 90 |
| image plane (INF) | −13.669 | 3.450 | 90 |

Tables 3B through 3D show aspherical values for the surfaces of the optical components for the example single fold optical system as illustrated in FIG. 6A:

TABLE 3B

|  | Prism S1 | L1S1 | L1S2 |
|---|---|---|---|
| Radius of curvature | 10.1475 | −4.5962 | 24.1370 |
| 4th order | −5.10336E−04 | −4.96952E−03 | −6.96106E−03 |
| 6th order | 1.31446E−07 | 3.25426E−04 | 2.34753E−03 |
| 8th order | −8.33779E−07 | −2.59701E−05 | −5.13966E−04 |
| 10th order | 1.26361E−07 | 3.54569E−05 | 1.47389E−04 |
| 12th order | −5.84423E−09 | −7.43090E−06 | −1.18246E−05 |
| 14th order |  | 1.91989E−06 | 1.99593E−07 |

TABLE 3C

|  | L2S1 | L2S2 | L3S1 |
|---|---|---|---|
| Radius of curvature | −5.8392 | −2.7004 | 7.9220 |
| 4th order | 2.08846E−02 | 2.80123E−02 | 4.36643E−02 |
| 6th order | −6.99973E−03 | −1.15153E−02 | −8.56777E−03 |
| 8th order | 9.61573E−04 | 2.21425E−03 | 4.95687E−04 |
| 10th order | −3.49028E−05 | −6.01848E−04 | −4.46371E−05 |

TABLE 3C-continued

| | L2S1 | L2S2 | L3S1 |
|---|---|---|---|
| 12th order | −8.47955E−07 | 1.40503E−04 | |
| 14th order | −2.38157E−06 | −2.85205E−05 | |

TABLE 3D

| | L3S2 | L4S1 | L4S2 |
|---|---|---|---|
| Radius of curvature | −5.3114 | −81.4716 | 6.5864 |
| 4th order | 3.90863E−02 | −1.94553E−03 | 8.73233E−04 |
| 6th order | −8.82724E−03 | 1.24447E−03 | −2.40538E−04 |
| 8th order | 1.21063E−03 | −3.53784E−04 | 4.64840E−05 |
| 10th order | −9.15778E−05 | 8.00536E−05 | −2.44547E−06 |
| 12th order | | −7.42994E−06 | 1.63492E−06 |
| 14th order | | 4.81112E−07 | −3.05210E−08 |

Table 3E shows material characteristics of the optical components for the example single fold optical system as illustrated in FIG. 6A. Nd refers to refractive index, and Vd refers to Abbe number of the material. L1-L4 refer to the four lenses in the second lens group from the object side to the image side of the optical system:

TABLE 3E

| | Prism | L1 | L2 | L3 | L4 |
|---|---|---|---|---|---|
| Nd | 1.535 | 1.544 | 1.671 | 1.544 | 1.671 |
| Vd | 55.73 | 55.97 | 19.23 | 55.97 | 19.23 |

Table 3F shows optical specifications for the example single fold optical system as illustrated in FIG. 6A. EFL is effective focal length, and Fno is the F-number of the optical system:

TABLE 3F

| EFL | 15.37 |
|---|---|
| Fno | 3.0 |
| semi-sensor diagonal | 2.52 |
| Macro distance | 125 cm |

Tables 4A through 4F provide optical and physical characteristics for the example single fold optical system as illustrated in FIG. 7A.

Table 4A shows all surface positions based on the Prism S1 global coordinate for the example single fold optical system as illustrated in FIG. 7A:

TABLE 4A

| | x | z | angle ($\alpha$) |
|---|---|---|---|
| aperture | 0 | 0.28 | 0 |
| Prism S1 | 0.000 | 0.000 | 0 |
| Prism inner surface | 0.000 | 0.349 | 0 |
| Prims S2 | 0.000 | 3.134 | 45 |
| Prism S3 | −2.785 | 3.134 | 90 |
| L1 S1 | −4.220 | 3.134 | 90 |
| L1S2 | −5.265 | 3.134 | 90 |
| L2S1 | −5.518 | 3.134 | 90 |
| L2S2 | −5.908 | 3.134 | 90 |
| L3S1 | −9.594 | 3.134 | 90 |
| L3S2 | −10.254 | 3.134 | 90 |
| L4S1 | −10.995 | 3.134 | 90 |
| L4S2 | −12.095 | 3.134 | 90 |
| IRcut S1 | −13.946 | 3.134 | 90 |

TABLE 4A-continued

| | x | z | angle ($\alpha$) |
|---|---|---|---|
| IRcut S2 | −14.156 | 3.134 | 90 |
| image plane (INF) | −14.256 | 3.134 | 90 |

Tables 4B through 4D show aspherical values for the surfaces of the optical components for the example single fold optical system as illustrated in FIG. 7A:

TABLE 4B

| | Prism S1 | L1S1 | L1S2 |
|---|---|---|---|
| Radius of curvature | 9.6677 | −4.5962 | 24.1370 |
| 4th order | −5.32525E−04 | −4.96952E−03 | −6.96106E−03 |
| 6th order | −8.96273E−06 | 3.25426E−04 | 2.34753E−03 |
| 8th order | 1.55564E−06 | −2.59701E−05 | −5.13966E−04 |
| 10th order | −1.69683E−07 | 3.54569E−05 | 1.47389E−04 |
| 12th order | 7.82692E−09 | −7.43090E−06 | −1.18246E−05 |
| 14th order | | 1.91989E−06 | 1.99593E−07 |

TABLE 4C

| | L2S1 | L2S2 | L3S1 |
|---|---|---|---|
| Radius of curvature | −5.8392 | −2.7004 | 7.9220 |
| 4th order | 2.08846E−02 | 2.80123E−02 | 4.36643E−02 |
| 6th order | −6.99973E−03 | −1.15153E−02 | −8.56777E−03 |
| 8th order | 9.61573E−04 | 2.21425E−03 | 4.95687E−04 |
| 10th order | −3.49028E−05 | −6.01848E−04 | −4.46371E−05 |
| 12th order | −8.47955E−07 | 1.40503E−04 | |
| 14th order | −2.38157E−06 | −2.85205E−05 | |

TABLE 4D

| | L3S2 | L4S1 | L4S2 |
|---|---|---|---|
| Radius of curvature | −5.3114 | −81.4716 | 6.5864 |
| 4th order | 3.90863E−02 | −1.94553E−03 | 8.73233E−04 |
| 6th order | −8.82724E−03 | 1.24447E−03 | −2.40538E−04 |
| 8th order | 1.21063E−03 | −3.53784E−04 | 4.64840E−05 |
| 10th order | −9.15778E−05 | 8.00536E−05 | −2.44547E−06 |
| 12th order | | −7.42994E−06 | 1.63492E−06 |
| 14th order | | 4.81112E−07 | −3.05210E−08 |

Table 4E shows material characteristics of the optical components for the example single fold optical system as illustrated in FIG. 7A. Nd refers to refractive index, and Vd refers to Abbe number of the material. L1-L4 refer to the four lenses in the second lens group from the object side to the image side of the optical system:

TABLE 4E

| | Prism | L1 | L2 | L3 | L4 |
|---|---|---|---|---|---|
| Nd | 1.514 | 1.834 | 1.544 | 1.671 | 1.544 |
| Vd | 51.35 | 37.16 | 55.97 | 19.23 | 55.97 |

Table 4F shows optical specifications for the example single fold optical system as illustrated in FIG. 7A. EFL is effective focal length, and Fno is the F-number of the optical system:

TABLE 4F

| EFL | 15.3 |
|---|---|
| Fno | 3.0 |

TABLE 4F-continued

| | |
|---|---|
| semi-sensor diagonal | 2.52 |
| Macro distance | 125 cm |

Tables 5A through 5F provide optical and physical characteristics for the example single fold optical system as illustrated in FIG. 8A.

Table 5A shows all surface positions based on the Prism S1 global coordinate for the example single fold optical system as illustrated in FIG. 8A:

TABLE 5A

| | x | z | angle (α) |
|---|---|---|---|
| aperture | 0 | 0.28 | 0 |
| Prism S1 | 0.000 | 0.000 | 0 |
| Prism inner surface | 0.000 | 0.700 | 0 |
| Prims S2 | 0.000 | 3.612 | 45 |
| Prism S3 | −2.912 | 3.612 | 90 |
| L1 S1 | −4.177 | 3.612 | 90 |
| L1S2 | −5.222 | 3.612 | 90 |
| L2S1 | −5.475 | 3.612 | 90 |
| L2S2 | −5.865 | 3.612 | 90 |
| L3S1 | −9.551 | 3.612 | 90 |
| L3S2 | −10.211 | 3.612 | 90 |
| L4S1 | −10.952 | 3.612 | 90 |
| L4S2 | −12.052 | 3.612 | 90 |
| IRcut S1 | −13.792 | 3.612 | 90 |
| IRcut S2 | −14.002 | 3.612 | 90 |
| image plane (INF) | −14.102 | 3.612 | 90 |

Tables 5B through 5D show aspherical values for the surfaces of the optical components for the example single fold optical system as illustrated in FIG. 8A:

TABLE 5B

| | Prism S1 | L1S1 | L1S2 |
|---|---|---|---|
| Radius of curvature | 10.9936 | −4.5962 | 24.1370 |
| 4th order | −4.47670E−04 | −4.96952E−03 | −6.96106E−03 |
| 6th order | −1.61255E−06 | 3.25426E−04 | 2.34753E−03 |
| 8th order | −1.31071E−07 | −2.59701E−05 | −5.13966E−04 |
| 10th order | 3.27852E−08 | 3.54569E−05 | 1.47389E−04 |
| 12th order | −1.37757E−09 | −7.43090E−06 | −1.18246E−05 |
| 14th order | | 1.91989E−06 | 1.99593E−07 |

TABLE 5C

| | L2S1 | L2S2 | L3S1 |
|---|---|---|---|
| Radius of curvature | −5.8392 | −2.7004 | 7.9220 |
| 4th order | 2.08846E−02 | 2.80123E−02 | 4.36643E−02 |
| 6th order | −6.99973E−03 | −1.15153E−02 | −8.56777E−03 |
| 8th order | 9.61573E−04 | 2.21425E−03 | 4.95687E−04 |
| 10th order | −3.49028E−05 | −6.01848E−04 | −4.46371E−05 |
| 12th order | −8.47955E−07 | 1.40503E−04 | |
| 14th order | −2.38157E−06 | −2.85205E−05 | |

TABLE 5D

| | L3S2 | L4S1 | L4S2 |
|---|---|---|---|
| Radius of curvature | −5.3114 | −81.4716 | 6.5864 |
| 4th order | 3.90863E−02 | −1.94553E−03 | 8.73233E−04 |
| 6th order | −8.82724E−03 | 1.24447E−03 | −2.40538E−04 |
| 8th order | 1.21063E−03 | −3.53784E−04 | 4.64840E−05 |
| 10th order | −9.15778E−05 | 8.00536E−05 | −2.44547E−06 |
| 12th order | | −7.42994E−06 | 1.63492E−06 |
| 14th order | | 4.81112E−07 | −3.05210E−08 |

Table 5E shows material characteristics of the optical components for the example single fold optical system as illustrated in FIG. 8A. Nd refers to refractive index, and Vd refers to Abbe number of the material. L1-L4 refer to the four lenses in the second lens group from the object side to the image side of the optical system:

TABLE 5E

| | Prism | L1 | L2 | L3 | L4 |
|---|---|---|---|---|---|
| Nd | 1.583 | 1.834 | 1.544 | 1.671 | 1.544 |
| Vd | 59.38 | 37.16 | 55.97 | 19.23 | 55.97 |

Table 5F shows optical specifications for the example single fold optical system as illustrated in FIG. 8A. EFL is effective focal length, and Fno is the F-number of the optical system:

TABLE 5F

| | |
|---|---|
| EFL | 15.3 |
| Fno | 3.0 |
| semi-sensor diagonal | 2.52 |
| Macro distance | 125 cm |

Tables 6A through 6F provide optical and physical characteristics for the example single fold optical system as illustrated in FIG. 9A.

Table 6A shows all surface positions based on the Prism S1 global coordinate for the example single fold optical system as illustrated in FIG. 9A:

TABLE 6A

| | x | z | angle (α) |
|---|---|---|---|
| aperture | 0 | 0.7 | 0 |
| Prism S1 | 0.000 | 0.000 | 0 |
| Prism S2 | 0.000 | 3.700 | 45 |
| Prism S3 | −3.300 | 3.700 | 90 |
| L1 S1 | −3.400 | 3.700 | 90 |
| L1S2 | −3.992 | 3.700 | 90 |
| L2S1 | −4.092 | 3.700 | 90 |
| L2S2 | −4.488 | 3.700 | 90 |
| L3S1 | −8.250 | 3.700 | 90 |
| L3S4 | −8.829 | 3.700 | 90 |
| L4S1 | −11.202 | 3.700 | 90 |
| L4S2 | −12.600 | 3.700 | 90 |
| IRcut S1 | −13.990 | 3.700 | 90 |
| IRcut S2 | −14.200 | 3.700 | 90 |
| image plane (INF) | −14.300 | 3.700 | 90 |

Tables 6B through 6D show aspherical values for the surfaces of the optical components for the example single fold optical system as illustrated in FIG. 9A:

TABLE 6B

| | Prism S1 | L1S1 | L1S2 |
|---|---|---|---|
| Radius of curvature | 5.6321 | −11.6936 | 21.5932 |
| 4th order | −2.68374E−04 | −2.40165E−03 | −1.27735E−03 |
| 6th order | −7.96206E−06 | 9.06400E−04 | 1.10220E−03 |
| 8th order | 2.54679E−07 | 1.27434E−05 | −1.35119E−04 |
| 10th order | −5.97297E−08 | 1.21772E−05 | 1.10012E−05 |
| 12th order | 2.34852E−09 | −9.78359E−06 | 1.83952E−05 |
| 14th order | | 3.15343E−06 | −1.67661E−06 |

TABLE 6C

|  | L2S1 | L2S2 | L3S1 |
|---|---|---|---|
| Radius of curvature | −298.9651 | −4.7109 | 5.5578 |
| 4th order | 2.63966E−03 | −1.33363E−03 | −2.38091E−02 |
| 6th order | −2.23391E−03 | −2.71636E−03 | 1.24316E−02 |
| 8th order | 3.72586E−04 | 4.30366E−04 | −1.91564E−03 |
| 10th order | 9.73830E−05 | 2.05012E−04 | −8.41607E−05 |
| 12th order | −3.53637E−05 | −1.05166E−04 | 1.12014E−04 |
| 14th order | 3.18196E−06 | 1.25474E−05 | −2.07762E−05 |

TABLE 6D

|  | L3S2 | L4S1 | L4S2 |
|---|---|---|---|
| Radius of curvature | −7.7071 | −20.8157 | 7.0734 |
| 4th order | −2.99254E−02 | −5.62662E−03 | −7.04620E−04 |
| 6th order | 1.16934E−02 | 1.10755E−04 | −5.93634E−04 |
| 8th order | −8.47579E−04 | −6.24552E−05 | 2.81487E−05 |
| 10th order | −3.95495E−04 | 2.98711E−05 | 4.61457E−06 |
| 12th order | 1.22802E−04 | −4.10901E−06 | 1.30778E−-07 |
| 14th order | −1.28792E−05 | 2.54296E−07 | −6.59262E−10 |

Table 6E shows material characteristics of the optical components for the example single fold optical system as illustrated in FIG. 9A. Nd refers to refractive index, and Vd refers to Abbe number of the material. L1-L4 refer to the four lenses in the second lens group from the object side to the image side of the optical system:

TABLE 6E

|  | Prism | L1 | L2 | L3 | L4 |
|---|---|---|---|---|---|
| Nd | 1.535 | 1.544 | 1.671 | 1.544 | 1.671 |
| Vd | 55.73 | 55.97 | 19.23 | 55.97 | 19.23 |

Table 6F shows optical specifications for the example single fold optical system as illustrated in FIG. 9A. EFL is effective focal length, and Fno is the F-number of the optical system:

TABLE 6F

| EFL | 22.03 |
|---|---|
| Fno | 4.0 |
| semi-sensor diagonal | 2.268 |
| Macro distance | 175 cm |

Anamorphic Lenses in Folded Optical Systems

Folded optical systems such as the single fold optical systems illustrated in FIGS. 1 through 11 include at least one prism with a reflective, flat second surface to fold the optical axis of the optical system. However, surface errors of the reflective surface of the prism(s) in folded optical systems may cause aberrations, in particular astigmatism, in the optical system. In other words, while ideally perfectly flat, the reflective surface of the prism will typically be flat within some tolerance level (e.g., a few microns) of the manufacturing process. Thus, the second (reflective) surface may be slightly curved, which results in the aforementioned aberrations. Using a glass prism may help to limit these aberrations when compared to plastic prisms, as glass can be polished to provide a tighter tolerance level in the manufacturing process than plastic. However, the reflective surface of a glass prism can only be guaranteed to be flat within some tolerance level. Further, due to variations in the manufacturing process, different groups or batches of prisms (whether glass or plastic) may vary in the "flatness" of the second, reflective surface.

In an optical system with astigmatism, rays that propagate in two perpendicular planes have different foci. For example, if an optical system with astigmatism is used to form an image of a cross, the vertical and horizontal lines will be in sharp focus at two different distances.

Embodiments of folded optical systems that include at least one anamorphic lens that is configured and oriented to correct for aberrations including astigmatism caused by surface errors of the reflective surface of the prism(s) in the folded optical systems are described. An anamorphic lens as described herein may, for example, be used in embodiments of the single fold optical systems that include a single power prism as described in reference to FIGS. 1 through 11. However, anamorphic lenses as described herein may also be used in other single fold optical systems or double fold optical systems to correct for aberrations including astigmatism caused by surface errors of the reflective surface(s) of the prism(s) in the folded optical systems. Anamorphic lenses as described herein may be used to correct for astigmatism caused by the flat reflective surfaces of power prisms or triangular prisms, or by the curved reflective surfaces of prisms such as freeform prisms.

A spherical lens has one or two curved (concave or convex) surfaces. The curvature of the surface(s) is the same on all axes (e.g., on an X and Y axis). Spherical lenses pass the image to the sensor without affecting the aspect ratio. An anamorphic lens has at least one curved (convex or concave) surface in which the curvature is different on at least one axis (e.g., different on the X axis than on the Y axis). The effective surface of an anamorphic lens may thus be oval, rather than round as in typical spherical lenses. Anamorphic lenses thus distort the image, squeezing it in one direction (e.g., horizontally) while leaving the other (e.g., vertical) aspect unaffected. Aspherical lenses can be designed and manufactured with different curvatures on different axes to correct for aberrations (e.g., astigmatism) caused by surface errors (e.g., curvature in one or more directions) of the reflective surfaces of prisms used in folded optical systems. In a folded telephoto optical system, an anamorphic lens may be used to correct the astigmatism by up to 20 µm without creating a distortion problem, as the effect on distortion of the anamorphic lens is relatively small.

The astigmatism caused by the reflective surface of prisms may differ. For example, one batch of prisms may have more, or less, surface error and thus more, or less, astigmatism than another batch of prisms, or the "direction" of the astigmatism may be different. Thus, in embodiments, the anamorphic lens may be configured to be rotated 90 degrees to correct for differing astigmatism in different prisms. In addition, two or more different anamorphic lenses with different amounts or orientations of curvature to correct for different levels of astigmatism may be provided, and a correct anamorphic lens and orientation of the lens may be selected for use with one or more prisms. For example, one anamorphic lens may be configured to correct for 2 micros of astigmatism, another for 10 microns of astigmatism, another for 20 microns of astigmatism, and so on.

A manufacturing process for folded optical systems that include anamorphic lenses to correct for aberrations including astigmatism caused by surface errors of the reflective surface(s) of the prism(s) is also described.

Figure 12A:
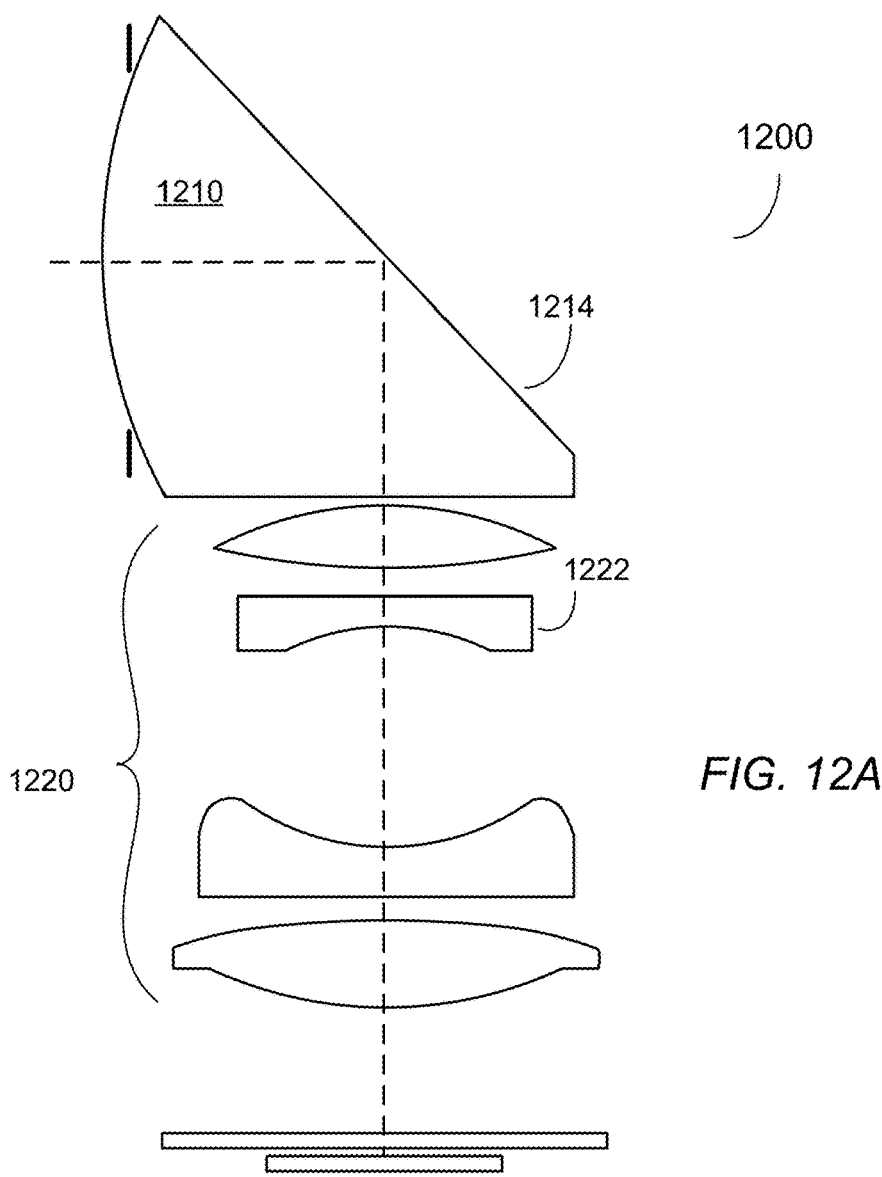
FIGS. 12A through 12D illustrate using an anamorphic lens in a lens stack to correct aberrations including astigmatism caused by surface errors of the reflective surface of a prism in a folded optical system, according to some embodiments.
Figure 12B:
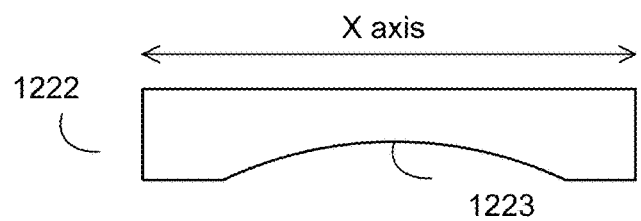
Figure 12C:
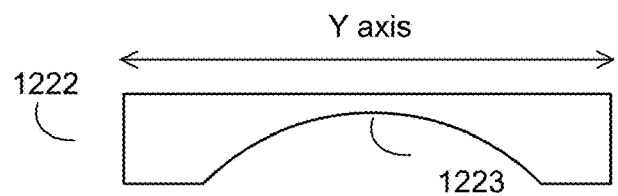

FIGS. 12A through 12D illustrate using an anamorphic lens in a lens stack to correct aberrations including astigmatism caused by surface errors of the reflective surface of a prism in a single fold optical system, according to some embodiments. FIG. 12A shows an example single fold lens system as shown in FIG. 1 that includes a power prism 1210 with a reflective surface 1214. In this example, the second lens 1222 in the lens stack 1220 has been replaced with an anamorphic lens as shown in FIGS. 12B and 12C to correct for astigmatism caused by surface errors (curvature) of the reflective surface 1214. FIGS. 12B and 12C show that the curvature of the second (object side) surface of the anamorphic lens 1222 is different on the X axis than on the Y axis. To correct for differing astigmatism caused by the reflective surface 1214 of prism 1210, the lens 1222 may be rotated 90 degrees. Alternatively, a different anamorphic lens 1222 with different curvature to correct for a different level of astigmatism may be selected and used with the prism 1210.

While FIG. 12A shows an anamorphic lens as the second lens 1222 in lens stack 1220, an anamorphic lens may instead be used at other lenses in the optical system 1200, for example as the first lens in the lens stack 1220. In some embodiments, more than one anamorphic lens may be used in an optical system 1200.

Figure 12D:
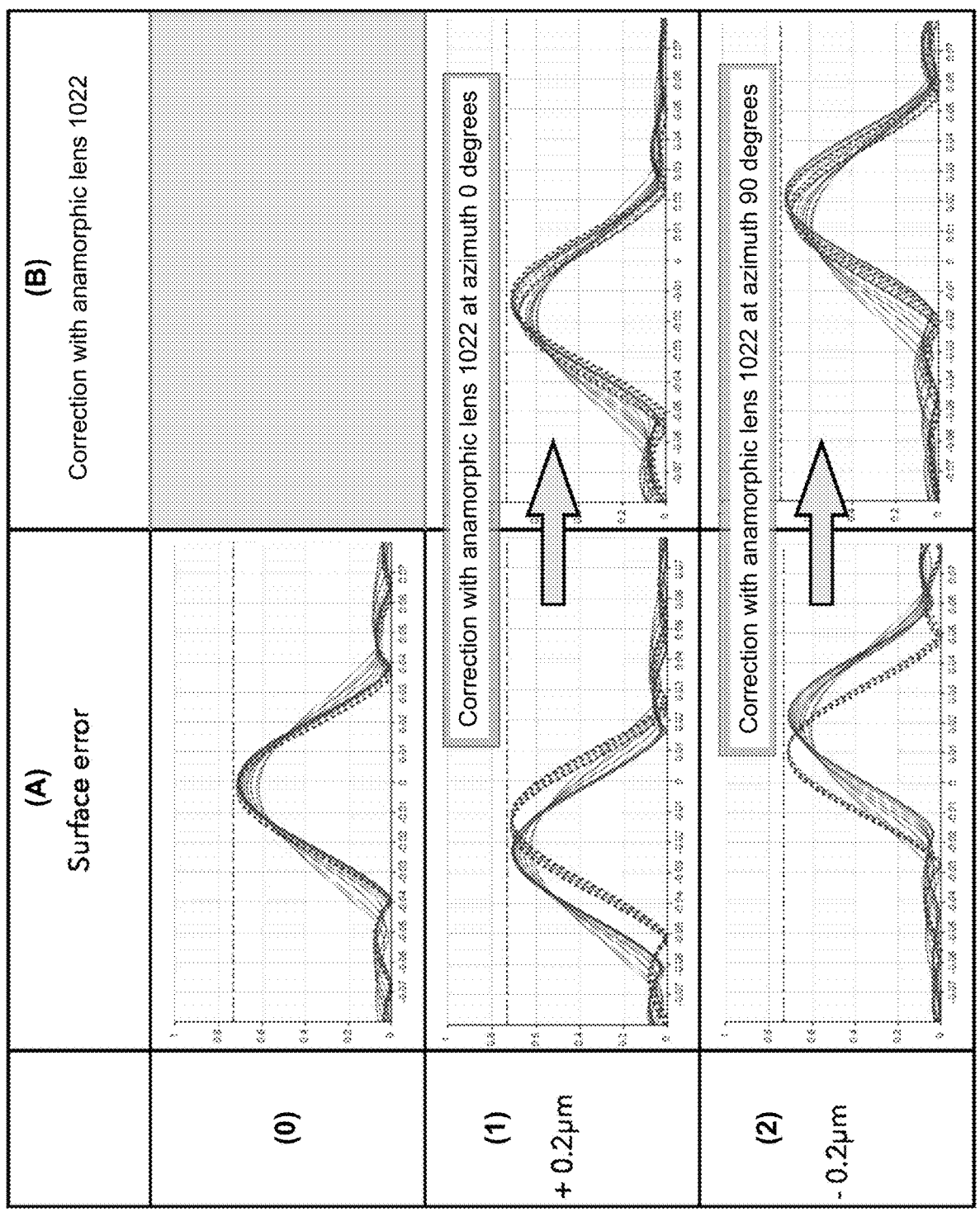

FIG. 12D graphically illustrates correcting for astigmatism in an example optical system 1200 with an anamorphic lens 1222 as illustrated in FIGS. 12A through 11C. (A)(0) shows an ideal MTF for the optical system, (A)(1) shows MTF with +0.2 microns of astigmatism, and (A)(1) shows MTF with −0.2 microns of astigmatism. (B)(1) shows correction of MTF with anamorphic lens 1122 oriented at azimuth 0 degrees to correct for the astigmatism of (A)(1), and (B)(2) shows correction of MTF with anamorphic lens 1122 oriented at azimuth 90 degrees to correct for the astigmatism of (A)(2).

Figure 13:
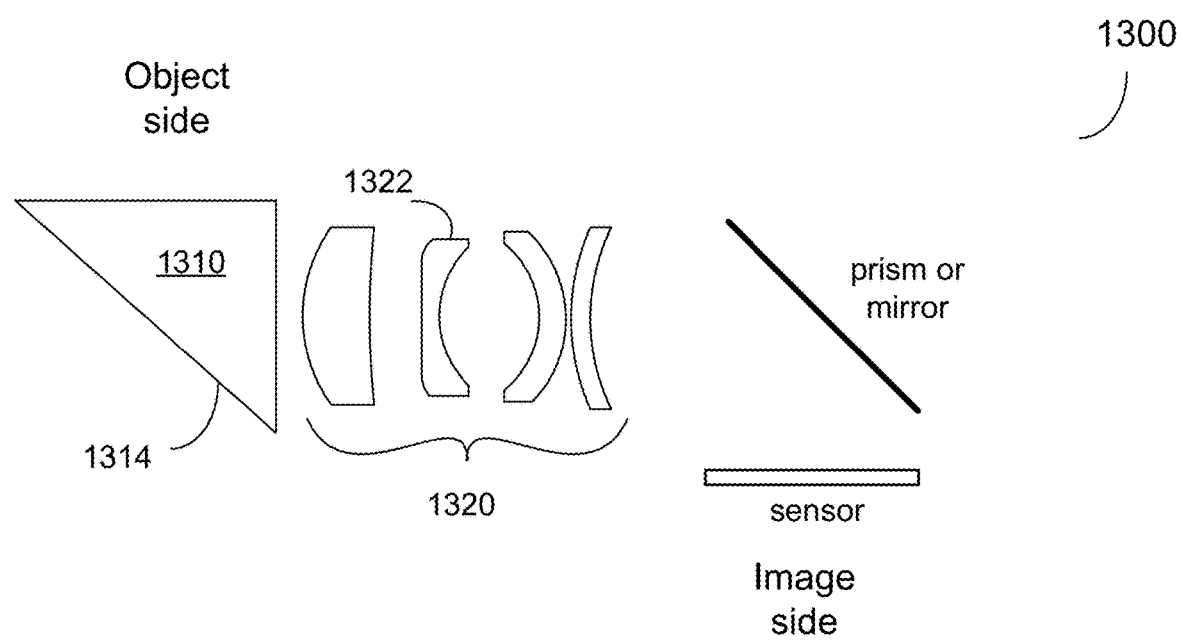
FIG. 13 illustrates using an anamorphic lens in a lens stack to correct aberrations including astigmatism caused by surface errors of the reflective surface of a prism in a double fold optical system, according to some embodiments.

FIG. 13 illustrates using an anamorphic lens 1322 in a lens stack 1320 to correct aberrations including astigmatism caused by surface errors of the reflective surface 1314 of a first prism 1310 in a double fold optical system 1300 that includes two light folding elements (e.g., a first and second prism, or a first prism and a mirror), according to some embodiments. In this example, the second lens 1322 in the lens stack 1320 has been replaced with an anamorphic lens, for example as shown in FIGS. 11B and 11C, to correct for astigmatism caused by surface errors (curvature) of the reflective surface 1314 of the first prism 1310. To correct for differing astigmatism caused by the reflective surface 1314 of prism 1310, the lens 1322 may be rotated 90 degrees. Alternatively, a different anamorphic lens 1322 with different curvature to correct for a different level of astigmatism may be selected and used with the prism 1310.

While FIG. 13 shows an anamorphic lens as the second lens 1322 in lens stack 1320, an anamorphic lens may instead be used at other lenses in the optical system 1300, for example as the first lens in the lens stack 1320. In some embodiments, more than one anamorphic lens may be used in an optical system 1300.

Figure 14:
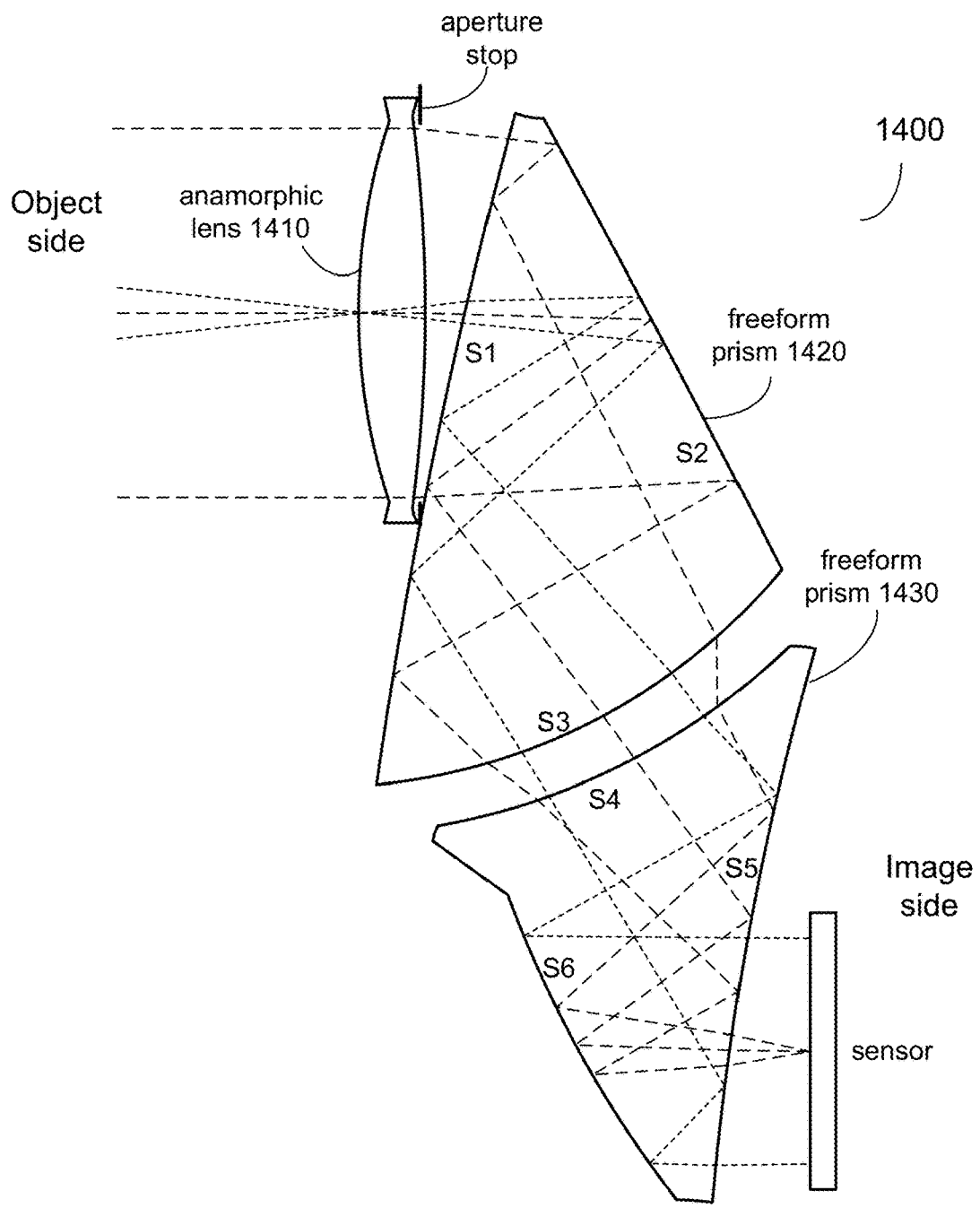
FIG. 14 illustrates using an anamorphic lens to correct aberrations including astigmatism caused by a freeform prism, according to some embodiments.

FIG. 14 illustrates using an anamorphic lens to correct aberrations including astigmatism caused by a freeform prism, according to some embodiments. As previously mentioned, freeform optics involve optical designs with at least one surface which has no translational or rotational symmetry about axes normal to the mean plane of the surface. A freeform prism is thus a prism that has at least one surface which has no translational or rotational symmetry about axes normal to the mean plane of the surface. Example folded optical system 1400 includes, in order from an object side to an image side, an anamorphic lens 1410, a first freeform prism 1420, and a second freeform prism 1430. The optical system 1400 may also include an aperture stop, for example located between anamorphic lens 1410 and freeform prism 1420. Light from an object field is refracted by anamorphic lens 1410 to surface S1 of freeform prism 1420. The light is refracted by surface S1 to surface S2, which reflects the light back to surface S1, thus folding the optical axis once. Surface S1 reflects the light to surface S3, thus folding the optical axis a second time. The light is refracted by surface S3 to surface S4 of freeform prism 1430. Surface S4 refracts the light to surface S5, which reflects the light to surface S6, thus folding the optical axis a third time. Surface S6 reflects the light to surface S5, thus folding the optical axis a fourth time. Surface S5 refracts the light received from surface S6 to form an image at an image plane, for example at or near the surface of a sensor.

The optical system 1400 of FIG. 14 is given by way of example. For example, an optical system may include only one freeform prism, may include a freeform prism and a standard prism or power prism, and/or may include additional spherical, aspherical, or anamorphic lenses. In this example, anamorphic lens 1410 is configured correct for astigmatism caused by one or more surfaces of the two freeform prisms, for example astigmatism caused by surface S2 of freeform prism 1420. To correct for differing astigmatism caused by the freeform prism(s), the anamorphic lens 1410 may be rotated 90 degrees. Alternatively, a different anamorphic lens 1410 with different curvature to correct for a different level of astigmatism may be selected and used with the freeform prism(s).

Figure 15:
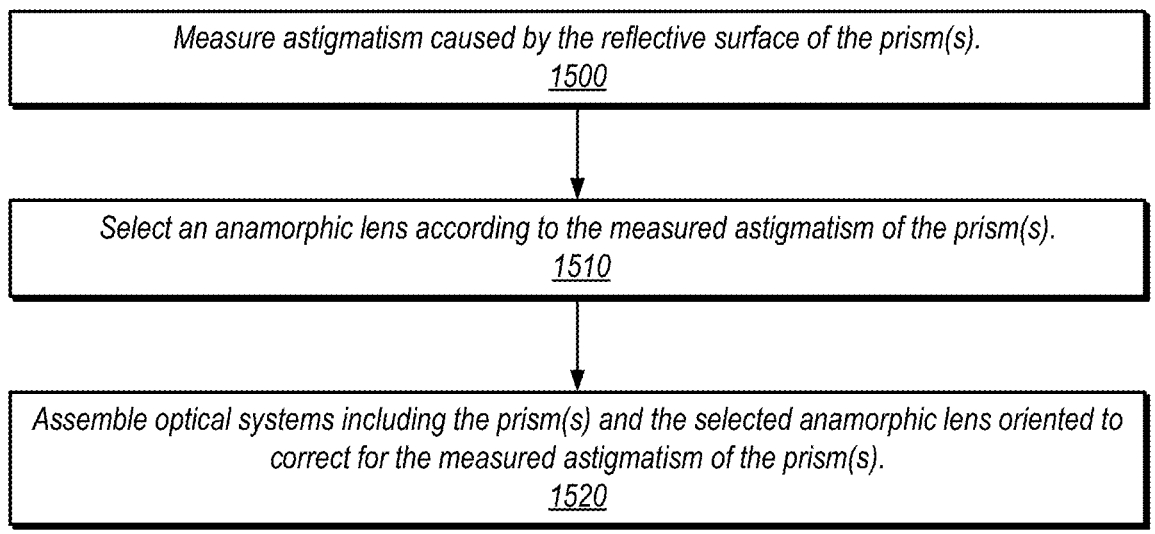
FIG. 15 is a high-level flowchart of a method of manufacturing a folded optical system that includes an anamorphic lens oriented to correct for aberrations including astigmatism caused by surface errors of the reflective surface of a prism in a folded optical system, according to some embodiments.

FIG. 15 is a high-level flowchart of a method of manufacturing a folded optical system that includes an anamorphic lens oriented to correct for aberrations including astigmatism caused by surface errors of the reflective surface of a prism in a folded optical system, according to some embodiments. As indicated at 1500, optical performance of one or more prisms may be measured to determine astigmatism caused by the reflective surface of the prism(s). Various methods may be used to measure the astigmatism of a prism, including but not limited to optical measurement methods (e.g., to measure MTF of the prism) and physical measurement methods (e.g., to directly measure surface error of the reflective surface). As indicated at 1510, an anamorphic lens may be selected according to the measured astigmatism of the prism(s). As previously noted, different anamorphic lenses with different levels of correction may be provided. As indicated at 1520, folded optical systems including the prisms and lenses including the selected anamorphic lens oriented to correct for the measured astigmatism may be assembled. As previously noted, an anamorphic lens may be rotated 90 degrees depending on the measured astigmatism. This process may be repeated, for example for different batches of prisms.

Example Computing Device

Figure 16:
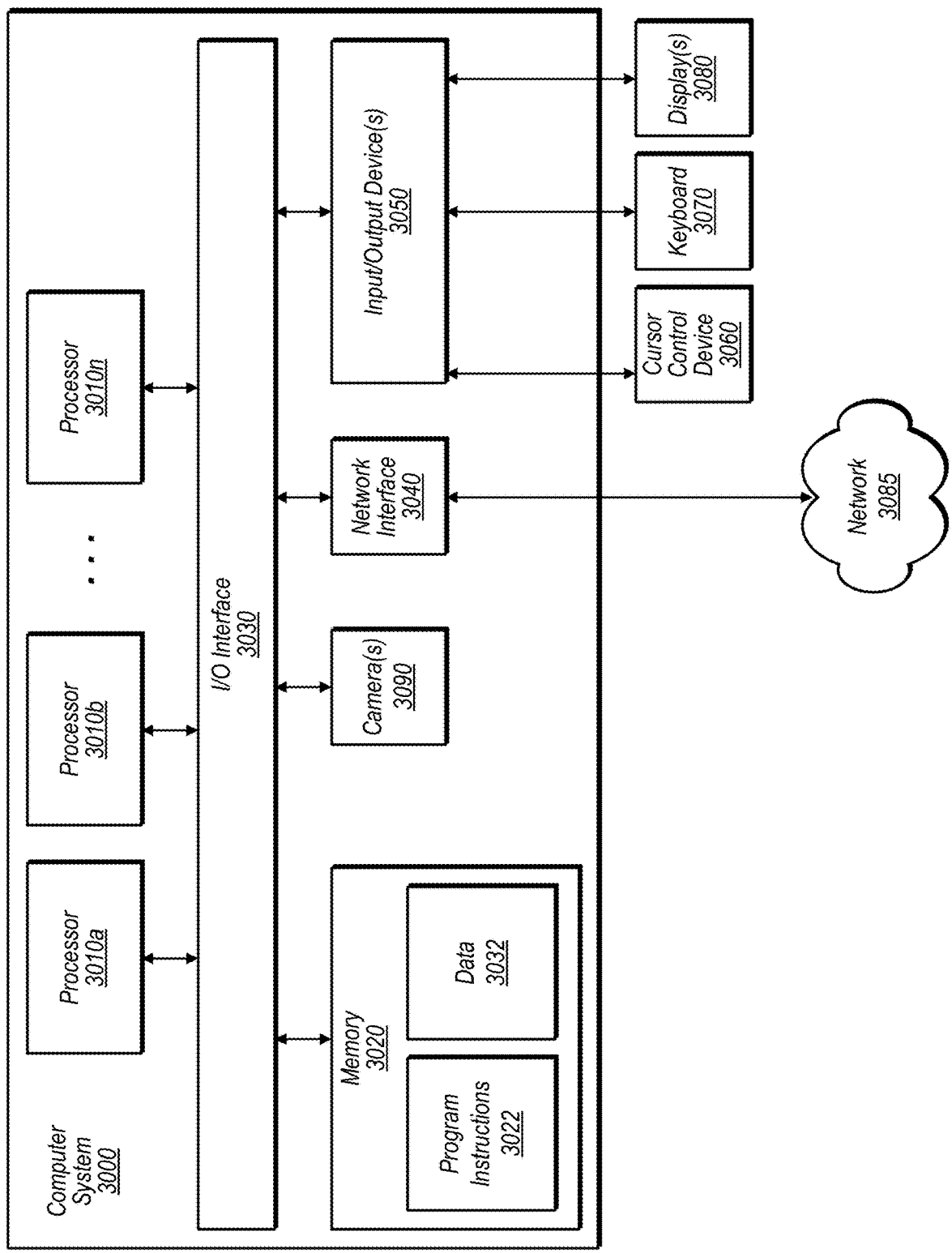
FIG. 16 illustrates an example computer system.

FIG. 16 illustrates an example computing device, referred to as computer system 3000, that may include or host embodiments of a camera with a folded optical system as illustrated in FIGS. 1 through 14. In addition, computer system 3000 may implement methods for controlling operations of the camera and/or for performing image processing of images captured with the camera. In different embodiments, computer system 3000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 3000 includes one or more processors 3010 coupled to a system memory 3020 via an input/output (I/O) interface 3030. Computer system 3000 further includes a network interface 3040 coupled to I/O interface 3030, and one or more input/output devices 3050, such as cursor control device 3060, keyboard 3070, and display(s) 3080. Computer system 3000 may also include one or more cameras 3090, for example at least one camera that includes a single fold optical system as described above with respect to FIGS. 1 through 14.

In various embodiments, computer system 3000 may be a uniprocessor system including one processor 3010, or a multiprocessor system including several processors 3010 (e.g., two, four, eight, or another suitable number). Processors 3010 may be any suitable processor capable of executing instructions. For example, in various embodiments processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions 3022 and/or data 3032 accessible by processor 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions 3022 may be configured to implement various interfaces, methods and/or data for controlling operations of camera 3090 and for capturing and processing images with integrated camera 3090 or other methods or data, for example interfaces and methods for capturing, displaying, processing, and storing images captured with camera 3090. In some embodiments, program instructions and/or data may be received, sent or stored upon different types of computer-accessible media or on similar media separate from system memory 3020 or computer system 3000.

In one embodiment, I/O interface 3030 may be configured to coordinate I/O traffic between processor 3010, system memory 3020, and any peripheral devices in the device, including network interface 3040 or other peripheral interfaces, such as input/output devices 3050. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computer system 3000 and other devices attached to a network 3085 (e.g., carrier or agent devices) or between nodes of computer system 3000. Network 3085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 3040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3050 may, in some embodiments, include one or more display terminals, keyboards, keypads, touchpads, scanning devices, voice or optical recognition devices, or any other devices suitable for entering or accessing data by computer system 3000. Multiple input/output devices 3050 may be present in computer system 3000 or may be distributed on various nodes of computer system 3000. In some embodiments, similar input/output devices may be separate from computer system 3000 and may interact with one or more nodes of computer system 3000 through a wired or wireless connection, such as over network interface 3040.

As shown in FIG. 16, memory 3020 may include program instructions 3022, which may be processor-executable to implement any element or action to support integrated camera 3090, including but not limited to image processing software and interface software for controlling camera(s) 3090. In some embodiments, images captured by camera(s) 3090 may be stored to memory 3020. In addition, metadata for images captured by camera(s) 3090 may be stored to memory 3020.

Those skilled in the art will appreciate that computer system 3000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 3000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 3000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 3000 may be transmitted to computer system 3000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The following clauses describe various aspects of optical systems, cameras, and/or methods incorporating embodiments as described above.

Clause 1. An optical system, comprising:
in order from an object side of the optical system to an image side of the optical system:
a first lens group comprising a power prism that includes a first surface, a second surface, and a third surface on an optical axis of the optical system, wherein the first surface is a transmissive aspherical surface that provides positive refractive power for the prism, wherein the second surface is a reflective surface that folds the optical axis of the optical system, and wherein the third surface is a transmissive surface; and
a second lens group comprising two or more refractive lenses; and
wherein the optical system satisfies the conditional expression:

$0.6 < B/A < 2.3$, where A is power of the optical system, and B is power of the first lens group.

Clause 2. The optical system as recited in clause 1, wherein the optical system satisfies the conditional expression:

$-0.2 < CD < 0.1$, where C is power of the second lens group, and D is length of the second lens group.

Clause 3. The optical system as recited in clause 1, further comprising an aperture stop located on the object side of the power prism.

Clause 4. The optical system as recited in clause 1, wherein the power prism is formed of an optical plastic material.

Clause 5. The optical system as recited in clause 1, wherein the power prism comprises a glass prism and a refractive lens composed of an optical plastic material attached to an object side surface of the glass prism.

Clause 6. The optical system as recited in clause 1, wherein the power prism comprises a glass prism and a refractive lens composed of an optical glass material attached to an object side surface of the glass prism.

Clause 7. The optical system as recited in clause 1, wherein Z-height of the optical system is 7.3 millimeters or less.

Clause 8. The optical system as recited in clause 1, wherein X-length of the optical system is 18 millimeters or less.

Clause 9. The optical system as recited in clause 1, wherein the second lens group consists of four refractive lens elements.

Clause 10. The optical system as recited in clause 9, wherein the four refractive lens elements comprise, in order from the object side of the optical system to the image side of the optical system:
a first lens with positive refractive power,
a second lens with negative refractive power;
a third lens with negative refractive power; and
a fourth lens with positive refractive power.

Clause 11. The optical system as recited in clause 9, wherein a second lens in the second lens group from the object side of the optical system is an anamorphic lens configured to correct for astigmatism caused by the second surface of the power prism.

Clause 12. The optical system as recited in clause 11, wherein the second lens is configured to be rotated 90 degrees to correct for a different amount of astigmatism caused by the second surface of the power prism.

Clause 13. The optical system as recited in clause 9, wherein at least one of the lenses in the second lens group is an anamorphic lens configured to correct for astigmatism caused by the second surface of the power prism.

Clause 14. The optical system as recited in clause 1, further comprising a light folding element located on the image side of the second lens group and configured to fold the optical axis of the optical system a second time, wherein a second lens in the second lens group from the object side of the optical system is an anamorphic lens configured to correct for astigmatism caused by the second surface of the power prism.

Clause 15. A camera, comprising, in order from an object side of the camera to an image side of the camera:
an optical system comprising:
a first lens group comprising a power prism that includes a first surface, a second surface, and a third surface on an optical axis of the optical system, wherein the first surface is a transmissive aspherical surface that provides positive refractive power for the prism, wherein the second surface is a reflective surface that folds the optical axis of the optical system, and wherein the third surface is a transmissive surface; and
a second lens group comprising two or more refractive lenses; and an image sensor configured to capture light projected onto a surface of the image sensor by the optical system;

wherein the optical system satisfies the conditional expression:

$0.6 < B/A < 2.3$, and $-0.2 < CD < 0.1$, where A is power of the optical system, B is power of the first lens group, C is power of the second lens group, and D is length of the second lens group.

Clause 16. The camera as recited in clause 15, wherein Z-height of the optical system is 7.3 millimeters or less, and wherein X-length of the optical system is 18 millimeters or less.

Clause 17. The camera as recited in clause 15, further comprising an aperture stop located on the object side of the power prism.

Clause 18. The camera as recited in clause 15, further comprising an infrared filter located between the second lens group and the image sensor.

Clause 19. The camera as recited in clause 15, wherein at least one of the lenses in the second lens group is an anamorphic lens configured to correct for astigmatism caused by the second surface of the power prism.

Clause 20. An optical system, comprising:
a prism that includes a first surface, a second surface, and a third surface on an optical axis of the optical system, wherein the second surface is a reflective surface that folds the optical axis of the optical system and the third surface is a transmissive surface; and
one or more refractive lenses, wherein at least one of the one or more refractive lenses is an anamorphic lens configured to correct for astigmatism caused by the prism.

Clause 21. The optical system as recited in clause 20, wherein the first surface of the prism is a transmissive aspherical surface.

Clause 22. The optical system as recited in clause 20, wherein the anamorphic lens is configured to be rotated 90 degrees to correct for a different amount of astigmatism caused by the prism.

Clause 23. The optical system as recited in clause 20, wherein the optical system comprises four refractive lenses located on an image side of the prism, wherein a second lens of the four refractive lenses from an object side of the optical system is the anamorphic lens configured to correct for astigmatism caused by the prism.

Clause 24. The optical system as recited in clause 23, wherein the second lens is configured to be rotated 90 degrees to correct for a different amount of astigmatism caused by the prism.

Clause 25. The optical system as recited in clause 20, wherein the one or more refractive lenses are located on an image side of the prism, the optical system further comprising a light folding element located on the image side of the one or more lenses and configured to fold the optical axis of the optical system a second time.

Clause 26. The optical system as recited in clause 20, wherein the prism is a power prism with positive refractive power.

Clause 27. The optical system as recited in clause 20, further comprising a refractive lens with positive refractive power attached to an object side surface of the prism.

Clause 28. The optical system as recited in clause 20, further comprising an aperture stop located on an object side of the prism.

Clause 29. The optical system as recited in clause 20, wherein the prism is a freeform prism.

Clause 30. The optical system as recited in clause 29, wherein the optical system further comprises a second freeform prism Clause 31. The optical system as recited in clause 20, wherein the anamorphic lens is located on an object side of the prism.

Clause 32. The optical system as recited in clause 20, wherein the anamorphic lens is located on an image side of the prism.

Clause 33. A camera, comprising, in order from an object side of the camera to an image side of the camera:
an optical system comprising:
a prism that includes a first surface, a second surface, and a third surface on an optical axis of the optical system, wherein the second surface is a reflective surface that folds the optical axis of the optical system, and the third surface is a transmissive surface; and
one or more refractive lenses, wherein at least one of the one or more refractive lenses is an anamorphic lens configured to correct for astigmatism caused by the prism; and
an image sensor configured to capture light projected onto a surface of the image sensor by the optical system.

Clause 34. The camera as recited in clause 33, wherein the first surface of the prism is a transmissive aspherical surface.

Clause 35. The camera as recited in clause 33, wherein the optical system comprises four refractive lenses located on an image side of the prism, wherein a second lens of the four refractive lenses from the object side of the optical system is the anamorphic lens configured to correct for astigmatism caused by the prism, and wherein the second lens is configured to be rotated 90 degrees to correct for a different amount of astigmatism caused by the prism.

Clause 36. The camera as recited in clause 33, further comprising a light folding element located between the four refractive lenses and the image sensor and configured to fold the optical axis of the optical system a second time.

Clause 37. The camera as recited in clause 33, further comprising an aperture stop located on the object side of the prism.

Clause 38. The camera as recited in clause 33, further comprising an infrared filter located between the lens group and the image sensor.

Clause 39. The camera as recited in clause 33, wherein the prism is a power prism with positive refractive power.

Clause 40. The camera as recited in clause 33, wherein the prism is a freeform prism.

Clause 41. The camera as recited in clause 40, wherein the optical system further comprises a second freeform prism Clause 42. The camera as recited in clause 33, wherein the anamorphic lens is located on an object side of the prism.

Clause 43. The camera as recited in clause 33, wherein the anamorphic lens is located on an image side of the prism.

Clause 44. A method, comprising:
forming one or more prisms of an optical glass or plastic material, wherein each prism includes a first surface, a second reflective surface, and a third transmissive surface on an optical axis;
measuring optical performance of the one or more prisms to determine astigmatism caused by the prisms;
selecting one or more anamorphic lenses according to the determined astigmatism of the one or more prisms; and
assembling one or more optical systems, each optical system including:

a first lens group including the prism; and
a second lens group including one or more refractive lens elements, wherein at least one of the one or more refractive lens elements is an anamorphic lens oriented to correct for the determined astigmatism of the respective prism.

Clause 45. The method as recited in clause 44, wherein the optical system further includes a second prism located on an image side of the second lens group.

Clause 46. The method as recited in clause 44, wherein the prism is a power prism.

Clause 47. The method as recited in clause 45, wherein the prism is a freeform prism.

What is claimed is:

1. An optical system, comprising:
   in order from an object side of the optical system to an image side of the optical system:
      a first lens group comprising a power prism that includes a first surface, a second surface, and a third surface on an optical axis of the optical system, wherein the first surface is a transmissive aspherical surface that provides positive refractive power for the prism, wherein the second surface is a reflective surface that folds the optical axis of the optical system, and wherein the third surface is a transmissive surface; and
      a second lens group comprising two or more refractive lenses; and
   wherein the optical system satisfies the conditional expressions:

$0.6 < B/A < 2.3$, where A is power of the optical system, and B is power of the first lens group, and $-0.2 < CD < 0.1$, where C is power of the second lens group, and D is length of the second lens group.

2. The optical system as recited in claim 1, further comprising an aperture stop located on the object side of the power prism.

3. The optical system as recited in claim 1, wherein the power prism is formed of an optical plastic material.

4. The optical system as recited in claim 1, wherein the power prism comprises a glass prism and a refractive lens composed of an optical plastic material attached to an object side surface of the glass prism.

5. The optical system as recited in claim 1, wherein the power prism comprises a glass prism and a refractive lens composed of an optical glass material attached to an object side surface of the glass prism.

6. The optical system as recited in claim 1, wherein Z-height of the optical system is 7.3 millimeters or less.

7. The optical system as recited in claim 1, wherein X-length of the optical system is 18 millimeters or less.

8. The optical system as recited in claim 1, wherein the second lens group consists of four refractive lens elements.

9. The optical system as recited in claim 8, wherein the four refractive lens elements comprise, in order from the object side of the optical system to the image side of the optical system:
   a first lens with positive refractive power,
   a second lens with negative refractive power;
   a third lens with negative refractive power; and
   a fourth lens with positive refractive power.

10. The optical system as recited in claim 8, wherein a second lens in the second lens group from the object side of the optical system is an anamorphic lens configured to correct for astigmatism caused by the second surface of the power prism.

11. The optical system as recited in claim 10, wherein the second lens is configured to be rotated 90 degrees to correct for a different amount of astigmatism caused by the second surface of the power prism.

12. The optical system as recited in claim 8, wherein at least one of the lenses in the second lens group is an anamorphic lens configured to correct for astigmatism caused by the second surface of the power prism.

13. The optical system as recited in claim 1, further comprising a light folding element located on the image side of the second lens group and configured to fold the optical axis of the optical system a second time, wherein a second lens in the second lens group from the object side of the optical system is an anamorphic lens configured to correct for astigmatism caused by the second surface of the power prism.

14. A camera, comprising, in order from an object side of the camera to an image side of the camera:
   an optical system comprising:
      a first lens group comprising a power prism that includes a first surface, a second surface, and a third surface on an optical axis of the optical system, wherein the first surface is a transmissive aspherical surface that provides positive refractive power for the prism, wherein the second surface is a reflective surface that folds the optical axis of the optical system, and wherein the third surface is a transmissive surface; and
      a second lens group comprising two or more refractive lenses; and
   an image sensor configured to capture light projected onto a surface of the image sensor by the optical system;
   wherein the optical system satisfies the conditional expression:

$0.6 < B/A < 2.3$, and $-0.2 < CD < 0.1$, where A is power of the optical system, B is power of the first lens group, C is power of the second lens group, and D is length of the second lens group.

15. The camera as recited in claim 14, wherein Z-height of the optical system is 7.3 millimeters or less, and wherein X-length of the optical system is 18 millimeters or less.

16. The camera as recited in claim 14, further comprising an aperture stop located on the object side of the power prism.

17. The camera as recited in claim 14, further comprising an infrared filter located between the second lens group and the image sensor.

18. The camera as recited in claim 14, wherein at least one of the lenses in the second lens group is an anamorphic lens configured to correct for astigmatism caused by the second surface of the power prism.

19. An optical system, comprising:
   a prism that includes a first surface, a second surface, and a third surface on an optical axis of the optical system, wherein the second surface is a reflective surface that folds the optical axis of the optical system and the third surface is a transmissive surface; and
   one or more refractive lenses, wherein at least one of the one or more refractive lenses is an anamorphic lens configured to correct for astigmatism caused by the prism.

* * * * *